United States Patent [19]

Hisamatsu et al.

[11] Patent Number: 5,726,957
[45] Date of Patent: Mar. 10, 1998

[54] REPRODUCING APPARATUS FOR A RECORDING MEDIUM AND CONTROL APPARATUS THEREFOR, FOR STORING ADMINISTRATION INFORMATION IN A REPRODUCTION STAND-BY MODE

[75] Inventors: Nobuaki Hisamatsu; Hiroyuki Kikkoji, both of Tokyo, Japan

[73] Assignee: Sony Corporation, Tokyo, Japan

[21] Appl. No.: 727,795

[22] Filed: Oct. 7, 1996

Related U.S. Application Data

[62] Division of Ser. No. 448,809, May 24, 1995.

[30] Foreign Application Priority Data

May 25, 1994 [JP] Japan ................................. 6-133976
May 25, 1994 [JP] Japan ................................. 6-133977

[51] Int. Cl.[6] .............................. G11B 17/22; G11B 3/90
[52] U.S. Cl. .......................... 369/30; 369/34; 369/58
[58] Field of Search ............................ 369/30, 32, 34, 369/47, 50, 54, 58, 33

[56] References Cited

U.S. PATENT DOCUMENTS

| | | | |
|---|---|---|---|
| 4,787,073 | 11/1988 | Masaki | 369/32 |
| 5,157,646 | 10/1992 | Amemiya et al. | 369/47 |
| 5,228,021 | 7/1993 | Sato et al. | 369/111 |
| 5,239,527 | 8/1993 | Sakiyama | 369/36 |
| 5,303,214 | 4/1994 | Kulakowski et al. | 369/34 |
| 5,446,714 | 8/1995 | Yoshio et al. | 369/48 |

*Primary Examiner*—Paul W. Huber
*Attorney, Agent, or Firm*—Limbach & Limbach L.L.P.

[57] ABSTRACT

A reproducing apparatus for a disc-like recording medium in which administration information of recorded information is recorded together with the information has a stocking section, a reproducing section, a transferring mechanism, a memory and a controller. A plurality of disc-like recording media are stocked in the stocking section in a laminate fashion. The reproducing section reproduces the information and the administration information recorded in the disc-like recording medium. The transferring mechanism selectively picks up the disc-like medium from the stocking section and transfers the picked-up recording medium between the stocking section and the reproducing section and transfers the recording medium to an eject position from the reproducing apparatus. The memory stores the administration information of the recording medium read out or reproduced by the reproducing section and information concerning a reproduction order. The controller controls each operation of the transferring mechanism, the reproducing section and the memory. When the recording medium is transferred to the eject position by the transferring mechanism, the controller deletes the information of administration of the recording medium transferred to the eject position and the reproduction order stored in the memory.

10 Claims, 31 Drawing Sheets

FIG. 12

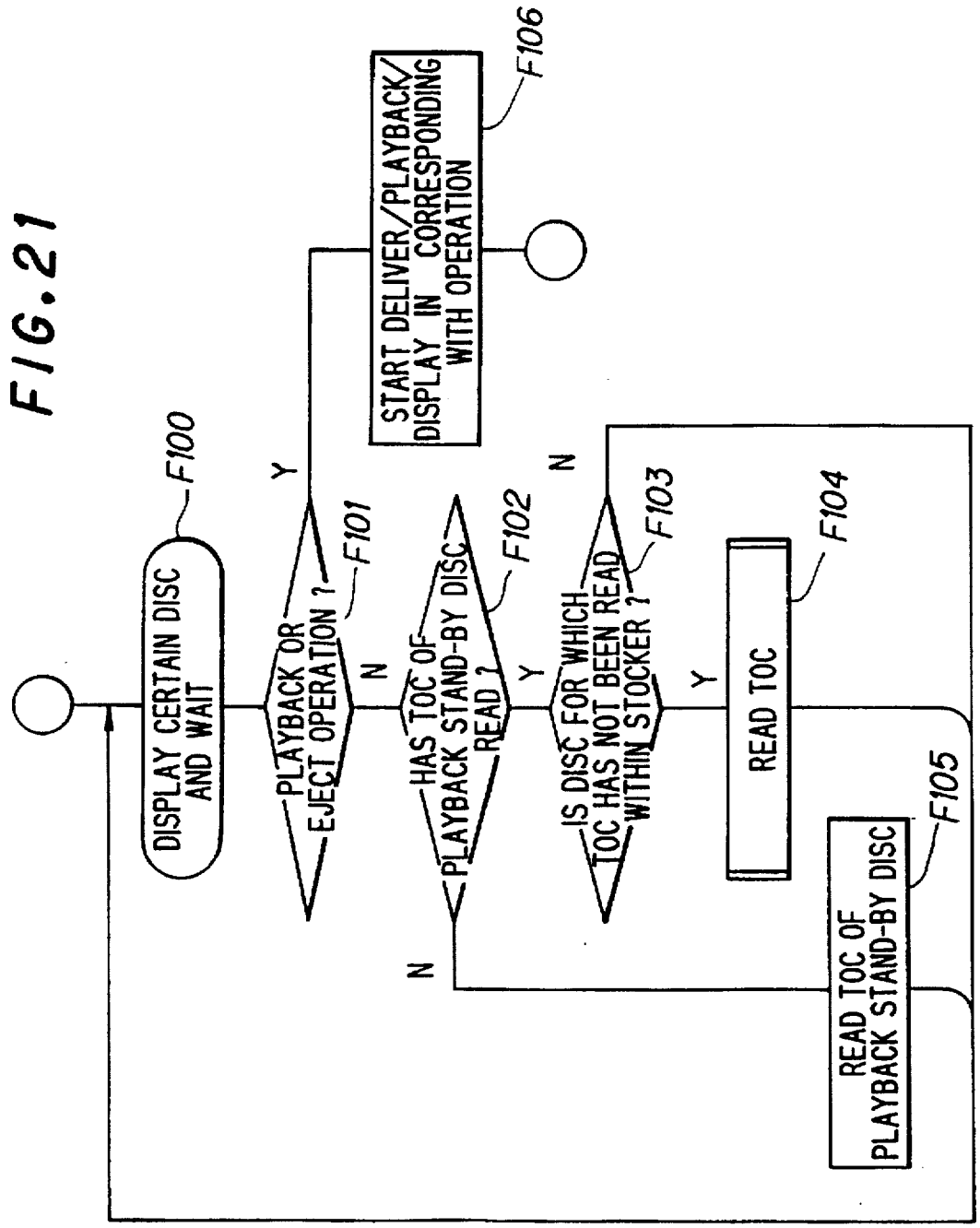

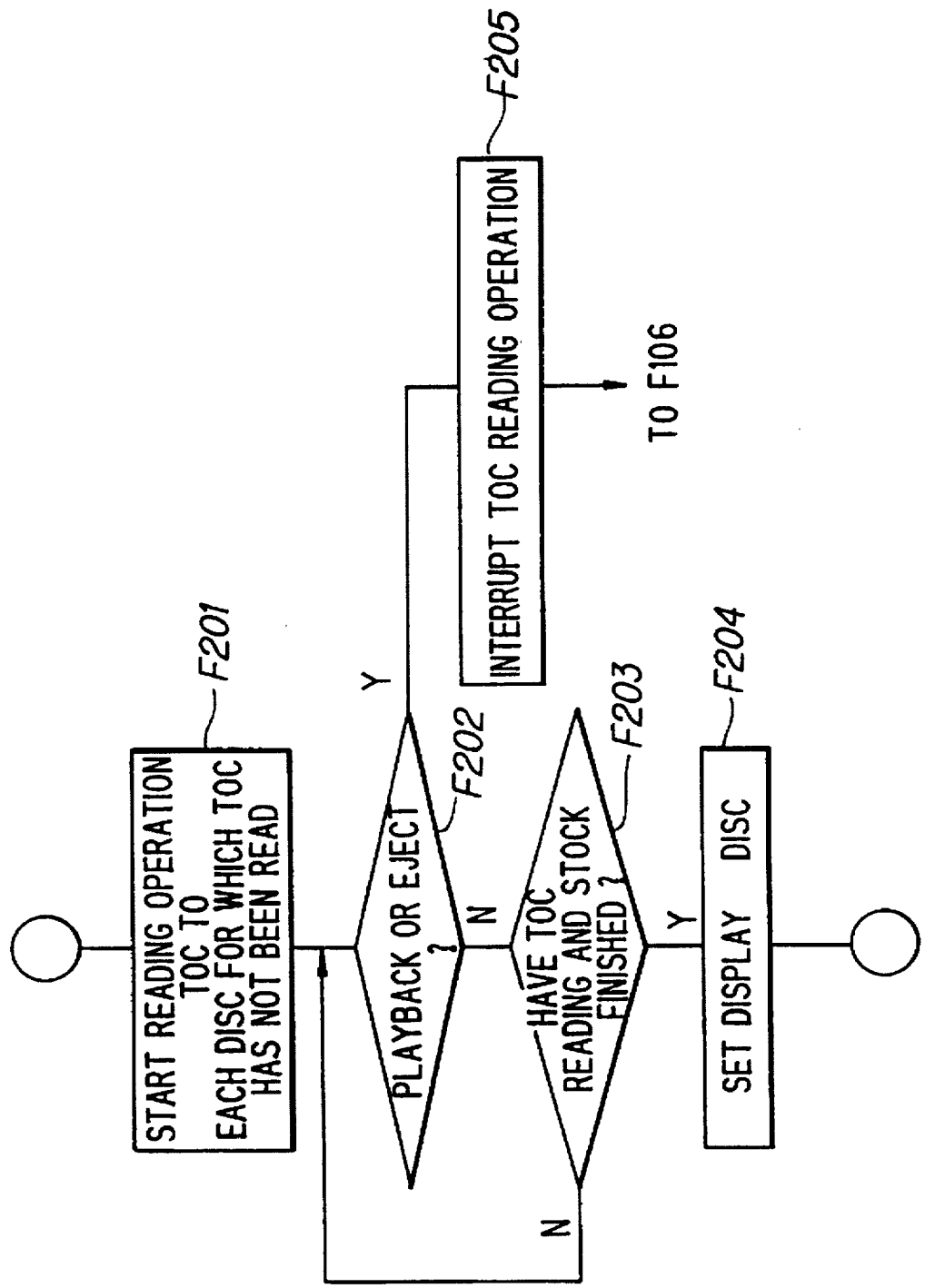

| PROGRAM STEPS | PROGRAM INPUT CONTENTS |
|---|---|
| 1 | DISC 1 ALL TRACKS |
| 2 | DISC 2 TRACK 1 |
| 3 | DISC 1 TRACK 8 |
| 4 | DISC 5 TRACK 5 |

EJECT DISC 3

| PROGRAM STEPS | PROGRAM INPUT CONTENTS |
|---|---|
| 1 | DISC 1 ALL TRACKS |
| 2 | DISC 3 TRACK 5 |
| 3 | DISC 2 TRACK 1 |
| 4 | DISC 3 TRACK 9 |
| 5 | DISC 3 ALL TRACKS |
| 6 | DISC 1 TRACK 8 |
| 7 | DISC 5 TRACK 5 |

REPRODUCING APPARATUS FOR A RECORDING MEDIUM AND CONTROL APPARATUS THEREFOR, FOR STORING ADMINISTRATION INFORMATION IN A REPRODUCTION STAND-BY MODE

This is a divisional of application Ser. No. 08/448,809, filed May 24, 1995, pending.

BACKGROUND

1. Field of the Invention

The present invention relates to a reproducing apparatus for a recording medium and its controlling method. In particular, the present invention relates to a reproducing apparatus for a recording medium having a exchanging function of a plurality of recording media and its controlling method.

2. Background of the Invention

Disc-like recording media such as CDs (Compact Discs) or the like (herein simply referred to as discs) have been widely used to record or reproduction for audio uses or the like. Recently, a reproducing apparatus having a disc changer mechanism for accommodating a plurality of discs and selectively reproducing recorded signals (hereinafter referred to as a disc changer apparatus) has been developed.

In such changer apparatus, a stocker which can receive or accommodate, for example, five trays holding discs is provided and the trays may be taken out from the stocker to a loading position on a disc reproducing section and a position for inserting/ejecting the discs.

For instance, the user may mount the discs and pick up the discs housed in the stocker by taking out the tray to the inserting/ejecting position. Also, the reproduction of the discs held by the tray may be carried out by moving the tray to the loading position.

By the way, in a disc such as CD, data for reproducing of tracks of music or the like are recorded in the innermost circumferential side of the disc as administration information called TOC (Table of Content) data. Namely, based upon the administration information, it is possible to recognize address information (absolute time) as a start position of each track, the number of tracks, a play time of each piece of music or the like. Then, in case of the reproduction of the disc, the disc player firstly reads out the TOC data of the disc and performs the reproducing operation of each track on the basis of the TOC data which has been read out.

Also in the above-described changer apparatus in which a plurality of discs may be accommodated, the TOC data is read out before the start of the reproducing operation in the same manner as in the above-described disc player. In case of the changer apparatus, in some cases, there is a defect if the TOC data is read out at the time when the disc that has been designated to be reproduced is loaded to the reproducing section, i.e. immediately before the reproducing operation.

For example, in a usual disc player, as is well known, there is a program playback mode in which the user can designate the order of play music for the loaded disc. In the case where the program playback mode is applied to the changer apparatus, the user can set to designate the order of the reproducing tracks over a plurality of received discs.

When the user designates the pieces of music one by one in the program playback mode, the display of the reproducing accumulation time is effected. However, the TOC data has to be read in the calculation of the reproducing time. In a usual disc player in which a single disc is reproduced, of course, there is no problem since the TOC data may be read at the time of loading. However, in the changer apparatus, in the case where there are discs for which the TOC data has not been read out in the discs accommodated in the stocker, i.e., the discs have not been loaded to the disc reproducing section, and in the case where a certain track (music) is designated out of the discs housed in the stocker, it is impossible to display the reproducing time accumulation immediately. Since it is possible to read out and store the TOC data for the discs that have been once loaded on the disc reproducing section, in the case where the discs which have never been picked up from the stocker are present, there is such a problem.

Accordingly, in order to effect the reproducing accumulation time display, the steps such as loading the stocked discs on the disc reproducing section, reading out TOC data and thereby displaying the reproducing accumulation time are necessary at the time when the tracks (music) included in the stocked discs are designated in the program. It is time-consuming to display the time after calculation of the reproducing accumulation time. This is troublesome for the user disadvantageously.

In addition, in the case where the TOC data is necessary for the discs stocked in the stocker due to any operation, the like problems would be raised.

Also, for example, the program playback mode in the above-described changer apparatus is carried out as follows:

For instance, it is possible to carry out the program designation like (1) a third piece of music of a second disc, (2) a fifth piece of music of a first disc, (3) a seventh piece of music of a fifth disc, . . . .

The program designation data are stored in an internal memory within the apparatus. If the reproducing operation is carried out by the operating section, the controller carries out the reproducing control in accordance with the music order designated by the program. The discs loaded on the disc reproducing section are exchanged and each part of the apparatus is thus controlled, if necessary.

Now, in the above-described disc player, in the case where the disc is ejected, the user might load another disc. Accordingly, the data in the memory for the program designation data are usually erased. However, in case of the changer apparatus, there is a case where there are some of the plurality of discs, accommodated in the stocker, which may be selectively ejected. In case of this changer apparatus, there is a possibility that only the ejected discs are exchanged. Accordingly, if all the program data in the memory are erased at the time when the eject operation is carried out, available data, i.e., the data of the music designation out of the discs which have not yet been ejected are erased. This would be not convenient.

Also, in the above-described changer apparatus, when the tray transferring operation is executed, it should be recognized what is the current transference condition, i.e., the position of the transferring mechanism and which tray is to be delayed. For example, under the condition that the power source is turned on, if the current transference condition is not recognized by the controller for controlling the transferring operation, it is impossible to perform the transferring operation in accordance with the manipulation of the user.

In order to detect the transference condition, it is possible to obtain an absolute address of a mechanical position by providing some sensors at respective transferring positions. In order to correspond to all the positions to be detected, the number of the necessary sensors is increased. This is not preferable. For this reason, there is a demand that, for example, only a sensor for obtaining a single absolute address in a direction in which the tray is caused to correspond to each stock position of the stocker and a sensor for detecting a relative address as at least stock position change are used.

Furthermore, there is a possibility that some mechanical operational error would occur in the transferring operation. It is desirable that the automatic return to the normal condition to some extent is attained for the operation error.

In the above-described changer apparatus, an opening/closing cover for opening/closing an opening portion formed for the operation of insert/discharge is provided. For example, the opening/closing cover is angularly moved in a direction in which the opening portion is opened by the eject operation of the tray, so that the tray is extruded to the outside of the apparatus. The opening/closing cover is closed, so that the interior of the apparatus is invisible from the opening portion of the front panel of the apparatus and also the foreign matter is prevented from entering the interior of the apparatus.

However, in the case where the user manually angularly rotates the opening/closing cover in a direction in which the opening portion is opened and his or her finger enters the interior of the apparatus, there is a quite large risk that the finger would be clamped by the transferring operation of the tray, arranged in the interior of the changer apparatus, in the vertical direction.

Also, in the case where the opening/closing cover is opened during the transferring operation of the tray in the vertical direction and the foreign matter is introduced there into, the foreign matter causes a breakdown of the changer apparatus, such as a damage given to the transferring mechanism.

SUMMARY OF THE INVENTION

It is therefore an object of the present invention to provide a reproducing apparatus for a recording medium which resolves the above-mentioned problems.

It is another object of the invention to provide a control method for a reproducing apparatus of a recording medium which resolves the above-mentioned problems.

According to the present invention, there is provided a reproducing apparatus for a recording medium in which administration information of recorded information is recorded. The reproducing apparatus includes a stocking section, a reproducing section, a transferring mechanism, a memory and a controller. A plurality of recording media are stocked in the stocking section. The reproducing section reproduces the information and the administration information recorded in the recording medium. The transferring mechanism selectively picks up the recording medium from the stocking section, transfers the picked-up recording medium between the stocking section and the reproducing portion and transfers the recording medium to an eject position from the reproducing apparatus. The memory stores the administration information of the recording medium played back by the reproducing section and information concerning a reproduction order. The controller controls each operation of the transferring mechanism, the reproducing section and the memory. When the recording medium is transferred to the eject position by the transferring mechanism, the controller erases the information of administration of the recording medium transferred to the eject position and the reproduction order stored in the memory.

According to the present invention, there is provided a reproducing apparatus for a recording medium in which administration information of recorded information is recorded together with the information. The reproducing apparatus includes a stocking section, a reproduction section, a transferring mechanism, a memory and a controller. A plurality of recording media are accommodated in the stocking section. The reproducing section reproduces the information recorded in the recording medium. The transferring mechanism selectively picks up the medium from the stocking section, transfers the picked-up recording medium between the stocking section and the reproducing section and transfers the recording medium to an eject position from the reproducing apparatus. The memory stores the administration information of the recording medium reproduced by the reproducing section. The controller controls each operation of the transferring mechanism, the reproducing section and the memory. If any recording medium for which the administration information is not stored in the memory is present in the plurality of recording media accommodated in the stocking section, when a reproducing operation of the recording media by the reproducing section is kept under a reproduction stand-by condition, the controller transferring controls the transferring mechanism, picks-up, from the stocking section, the recording medium for which the administration information has not been stored into the memory, and reproduces the recording medium so that the administration information of the recording medium is stored in the memory.

According to the present invention, there is provided a reproducing apparatus for a recording medium in which administration information of recorded information is recorded. The reproducing apparatus includes a stocking section, a reproducing section, a transferring mechanism, an operation input section, a memory and a controller. A plurality of recording media are accommodated in the stocking section. The reproducing section reproduced the information and the administration information recorded in the recording medium. The transferring mechanism selectively picks up the disc-like medium from the stocking section, transfers the picked-up recording medium between the stocking section and the reproducing section and transfers the recording medium to an eject position from the reproducing apparatus. The memory stores the information concerning a reproduction order of the recording medium reproduced by the reproducing section and by the input section. The controller controls each operation of the transferring mechanism, the reproducing section and the memory. When the recording medium is delivered to the eject position by the transferring mechanism, the controller erases the reproduction order stored in the memory.

According to the present invention, there is provided a control method for a reproducing apparatus for a recording medium in which administration information of recorded information is recorded together with the information. The reproducing apparatus includes a stocking section, a reproducing section, a transferring mechanism, and a memory. A plurality of recording media are accommodated in the stocking section. The reproducing section reproduces the information and the administration information recorded in the recording medium. The transferring mechanism selectively picks up the disc-like medium from the stocking section, transfers the picked-up recording medium between the stocking section and the reproducing section and transfers the recording medium to an eject position from the reproducing apparatus. The memory stores the administration information of the recording medium reproduced by the reproducing section and information concerning a reproduction order. According to the control method, when the recording medium is transferred to the eject position by the transferring mechanism, the information of administration of the recording medium transferred to the eject portion and the reproduction order stored in the memory are erased.

According to the present invention, there is provided a control method for a reproducing apparatus for a recording medium in which administration information of recorded information is recorded together with the information. The reproducing apparatus includes a stocking section, a reproducing section, a transferring mechanism, and a memory. A plurality of recording media are accommodated in the stocking section. The reproducing section reproduced the information recorded in the recording medium. The transferring mechanism selectively picks up the medium from the stocking section, transfers the picked-up recording medium between the stocking section and the reproducing section and transfers the recording medium to an eject position from the reproducing apparatus. The memory stores the administration information of the recording medium reproduced by the reproducing section. According to the control method, if any recording medium for which the administration information is not stored in the memory is present in the plurality of recording media accommodated in the stocking section, when a reproducing operation of the recording media by the reproducing section is kept under a reproduction stand-by condition, the control method includes the steps of transferring controlling the transferring mechanism, picks up, from the stocking section, the recording medium for which the administration information has not been stored into the memory, and reproducing the recording medium so that the administration information of the recording medium is stored in the memory.

According to the present invention, there is provided a control method for a reproducing apparatus for a recording medium. The reproducing apparatus includes a stocking section, a reproducing section, a transferring mechanism, and an opening/closing mechanism. A plurality of recording media are accommodated in the stocking section. The reproducing section reproduced the information recorded in the recording medium. The transferring mechanism selectively picks up the medium from the stocking section, transfers the recording medium between the stocking section and the reproducing section and transfers the recording medium to an eject position from the reproducing apparatus. The opening/closing mechanism allows the transferring mechanism to move in a opening direction to thereby cause it to reach the eject position. According to the control method, when the transferring mechanism is kept under the transferring direction, and when the opening/closing mechanism is moved to the opening direction, the transferring operation of the transferring mechanism is stopped.

According to the present invention, there is provided a reproducing apparatus for a recording medium. The reproducing apparatus includes a stocking section, a reproducing section, a transferring mechanism, a position detecting section and a controller. A plurality of recording media are accommodated in the stocking section. The reproducing section reproduced the information recorded in the recording medium. The transferring mechanism selectively picks up the medium from the stocking section, transfers the recording medium between the stocking section and the reproducing section and transfers the recording medium to an eject position from the reproducing apparatus. The position detecting section detects positions of the transferring mechanism. The controller controls each operation of the transferring mechanism and the reproducing section. Under a condition before a reproduction start by the reproducing section, after the position detecting section detects that the transferring mechanism has reached an initial position, the controller causes the transferring mechanism to perform a returning operation of the recording medium to the stocking section by the transferring mechanism kept under the condition before the reproduction start.

According to the present invention, the information concerning the reproduction order and the administration information of a plurality of recording media recorded in the memory are stored until the recording medium reaches the eject position. Accordingly, it is unnecessary to perform the storage operation of the information concerning the reproduction order and the reading out operation of the administration information of the recording medium for every time when the reproducing operation is carried out.

According to the present invention, under the condition that the reproducing section does not reproduce the recording medium, under the condition of the reproduction stand-by condition, the recording medium for which the administration information has not yet been stored is picked up, and the administration is read out and stored in the memory, whereby the subsequent reproducing operation may be quickly performed.

According to the present invention, the position of the transferring mechanism is detected on the basis of the position in which the recording medium is accommodated in the stocking section by the transferring mechanism, whereby it is possible to readily detect or recognize the position of the transferring mechanism at a time of turn-on of the power source. Also, even if an error is generated in the transferring mechanism due to a mechanical malfunction, it is possible to perform a returning operation to a normal condition.

According to the present invention, when the opening/closing mechanism is opened during the transferring operation by the transferring mechanism, the transferring mechanism operation is automatically stopped whereby the damage of the transferring mechanism is prevented and at the same time, an occurrence of an accident may be prevented.

BRIEF DESCRIPTION OF THE DRAWINGS

In the accompanying drawings:

FIG. 12 is an illustration of the vertical transferring operational condition of the disc changer apparatus shown in FIG. 1, showing a condition that the disc on the subtray is loaded on the disc reproducing section;

FIG. 21 is a flowchart showing an example of an administration information reading operation of the disc changer apparatus;

FIG. 22 is a flowchart showing another example of an administration information reading operation of the disc changer apparatus;

DESCRIPTION OF THE INVENTION

A reproducing apparatus of a recording medium according to the present invention will now be described with reference to the accompanying drawings. Incidentally, in the following embodiment, a reproducing apparatus of a recording medium for a disc-like recording medium having administration information such as recorded music information, such as a Compact Disc will be exemplified and explained.

A mechanical structure of a disc changer apparatus as a reproducing apparatus will first be explained. Incidentally, FIGS. 1 to 11 will be used in the explanation of the structure of the disc changer apparatus. The explanation will be limited only to parts directly relating to the present invention in the structural parts shown.

<1. OVERALL STRUCTURE OF CHANGER APPARATUS>

Figure 1:
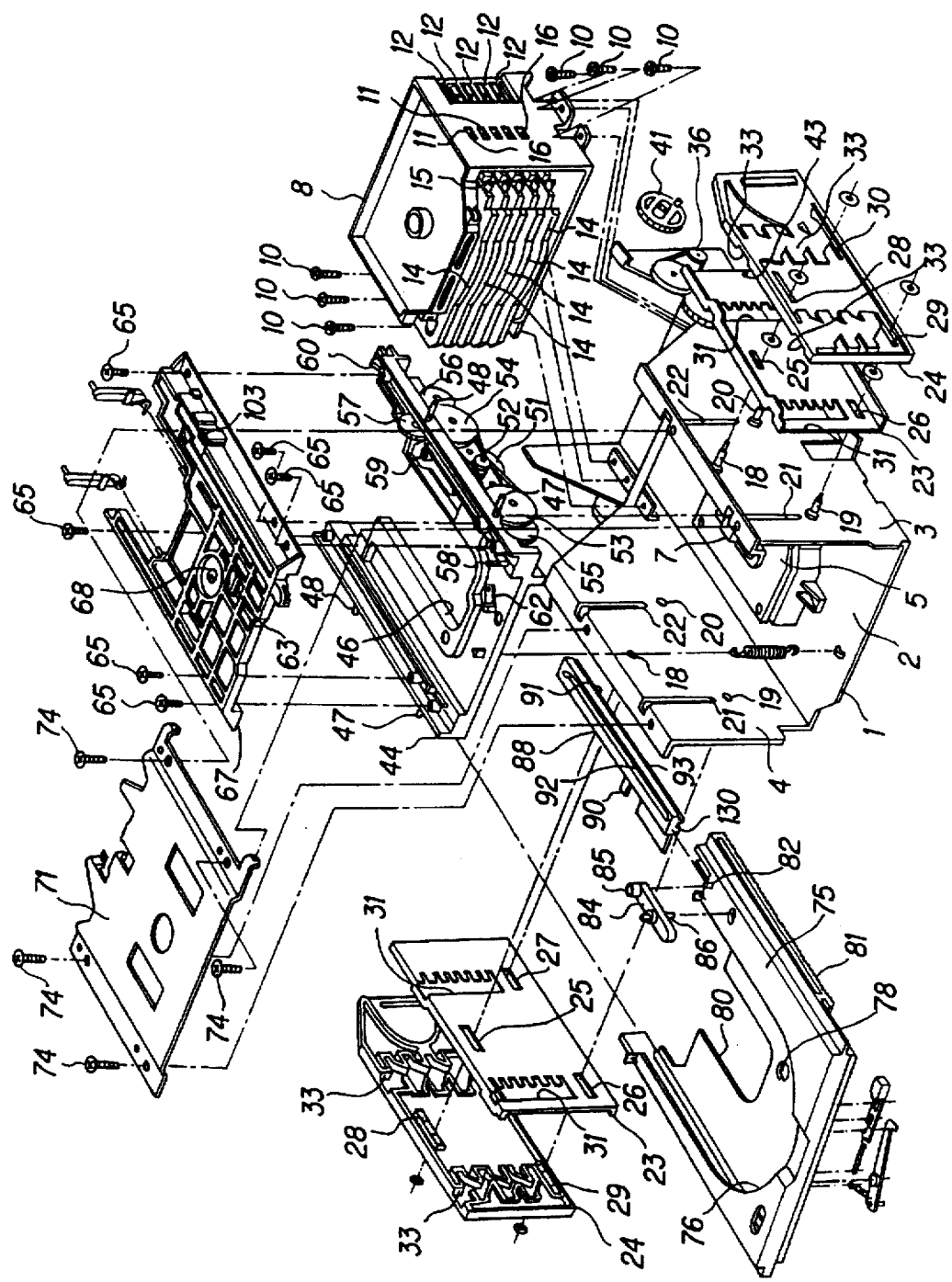
FIG. 1 is an exploded perspective view showing a structure of a disc changer apparatus according to the present invention.

An exploded perspective view of primary part of a disc changer apparatus is shown in FIG. 1.

This changer apparatus has a chassis 1. A disc reproducing section 5 having a disc table 6 on which a disc-like recording medium (hereinafter simply referred to as a disc) is laid as shown in FIG. 1 and an optical head 7 for read out signals from the disc is provided on a bottom plate portion 2 of the chassis 1. A stocker 8 which can accommodate a plurality of discs received on subtrays 14 is mounted by screws 10 on a rear side of the chassis 1. The stocker 8 is constructed so as to accommodate or receive five subtrays 14 which are received in a laminate state from a first stock height position to a fifth stock height position.

An elevator block which is composed of an elevator block base 44 and an elevator block top 67 is further provided on an upper side of the disc reproducing section 5 in the chassis 1. The elevator block constitutes, together with a first cam plate and a second cam plate which will be described later, a transferring mechanism for selectively picking up the discs from the stocker 8 and transferring the discs to a loading position on the disc table 6 of the disc reproducing section 5 and transferring the disc to an eject position outside the apparatus body.

The elevator block base 44 and the elevator block top 67 are formed into one piece by screws 65 and a support pins 47 and 48 of the elevator block base 44 are inserted into guide slits 21 and 22 formed on both side wall portions 3 and 4. As a result, the elevator block may be moved up and down through an elevator mechanism and hence may be moved from a position close to the disc reproducing section 5 to a height position, i.e., fifth stop height position corresponding to the uppermost stock position of the stocker 8.

A main tray 75 is supported to the elevator block. The main tray 75 is movable in the horizontal direction from a positional state (play position) where it is received within the elevator block to a positional state (eject position) where it is projected forwardly from the elevator block. The main tray 75 is transferred in the vertical direction while being held by the elevator block under the condition that it is in the reproducing position.

The subtrays 14 accommodated in the stocker 8 may be selectively carried out and received in the main tray 75. Namely, when the main tray 75 is moved up and down while being held by the elevator block and takes a condition to correspond to a certain stock position of the stocker 8, the subtray 14 received in that stock position is drawn by a slider 88 incorporated in the main tray 75 and retracted and engaged within the main tray 75. Also, inversely, the subtray is drawn from the main tray 75 and received in the stocker 8.

Accordingly, the subtray 14 is transferred in the horizontal direction from a positional state (stock position) where it is received in the stocker 8 to a position (reproducing position) where it is incorporated in the main tray 75 and at the same time is transferred from the reproducing position to the eject position together with the main tray 75. Also, the subtray is transferred in the vertical direction while being held by the elevator block together with the main tray 75.

The discs are laid on each subtray 14 and the user may load/eject the discs as a result of the transference of the subtray 14 to the eject position. Also, the subtray 14 is transferred to the stock position so that the discs are received or accommodated in the stocker 8. The subtray 14 is transferred to a position (loading position) of the disc reproducing section 5 so that the disc received or held on a certain subtray 14 is chucked by the disc table 6 of the disc reproducing section 5 and rotated by the spindle motor for the reading out by the optical head 7.

A first cam plate 24 and a second cam plate 23 are mounted on the outside of each of side wall portions 3 and 4 of the chassis 1.

Support slits 28, 29 and 30 are provided in the form of oblong shapes in the horizontal direction in the first cam plate 24 and also support slits 25, 26 and 27 are provided in the form of oblong shape in the horizontal direction in the similar positions in the second cam plate 23.

Support pins 18, 19 and 20 are formed on the outside of each of the side wall portions 3 and 4 and the support pins 18, 19 and 20 are engaged with the slits 25 and 28, 26 and 29, and 27 and 30, respectively, so that the first and second cam plates 24 and 23 are supported movably in the horizontal direction relative to the chassis 1.

Cam grooves 33 are formed in the first cam plate 24, and cam holes 31 are also formed in the second cam plate 23. Then, as described above, support pins 47 and 48 of an elevator block base 44 which pins are caused to pass through the guide slits 21 of the chassis reach the second cam plate 23 through the cam holes 31 and reach the cam groove 33 of the first cam plate 24.

The first and second cam plates 24 and 23 are repeatedly moved back and forth in the horizontal direction in a predetermined range relative to the chassis 1, so that the support pins 47 and 48 are guided by the cam holes 31 and the cam grooves 33 and moved upwardly or downwardly. Namely, the elevator block is moved up and down within the chassis by the repeated back-and-forth movement of the first and second cam plates 24 and 23 in the horizontal direction.

A reference numeral 71 denotes a top plate which is mounted on a top surface of the chassis 1.

<2. Subtray and stocker structure>

The positional relationship or operational condition of each of these structural parts in a transferring state, a stock state or the like will be explained with reference to FIGS. 2 to 12.

Figure 2:
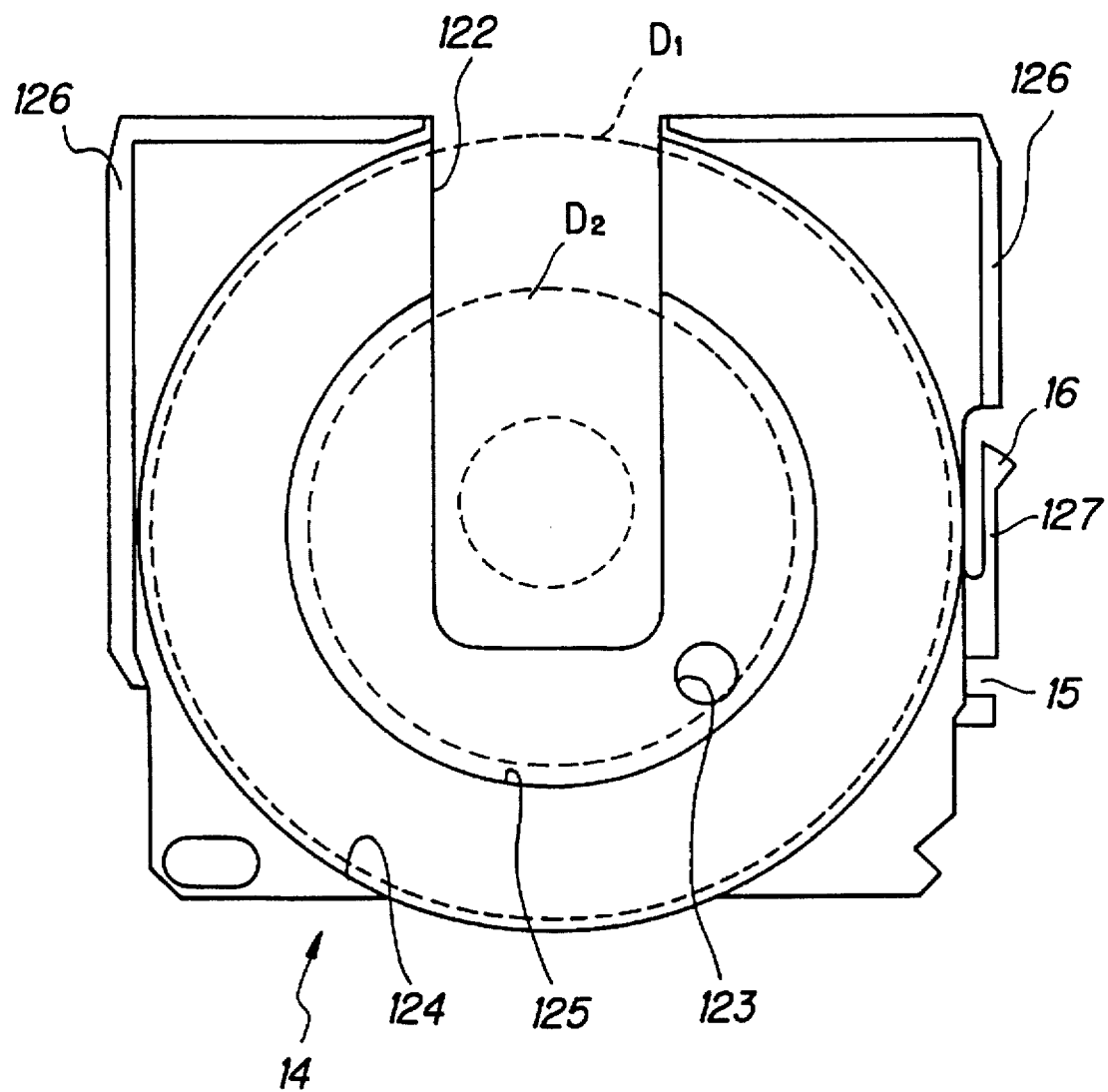
FIG. 2 is a plan view showing a subtray used in the disc changer apparatus shown in FIG. 1.

FIG. 2 shows the subtray 14. The subtray 14 is formed a large diameter recess portion 124 corresponding to a disc $D_2$ having a diameter of 12 cm for putting on or receiving it thereon and a small diameter recess portion 125 corresponding to a disc $D_1$ having a diameter of 8 cm. These recess portions 124,125 are formed on one surface of each of the subtray 14. Thus, the subtray 14 is formed so as to put on or receive the two kinds of discs $D_1$ and $D_2$.

A reference numeral 122 denotes a cutaway portion for allowing the disc, being laid on the subtray 14, to face the optical head 7 and the disc table 6 when the subtray 14 is transferred to the loading position. A projection 16 is formed through a spring portion 127 on one side of the subtray 14 and is provided with an engagement recess portion 15.

A somewhat thinned jaw portion 126 is formed in each of the rear portion and both side portions of the subtray 14.

A reference numeral 123 denotes a sensor hole formed for the sensor operation to detect whether or not the disc is laid on the subtray 14. This will be explained later.

Figure 3:
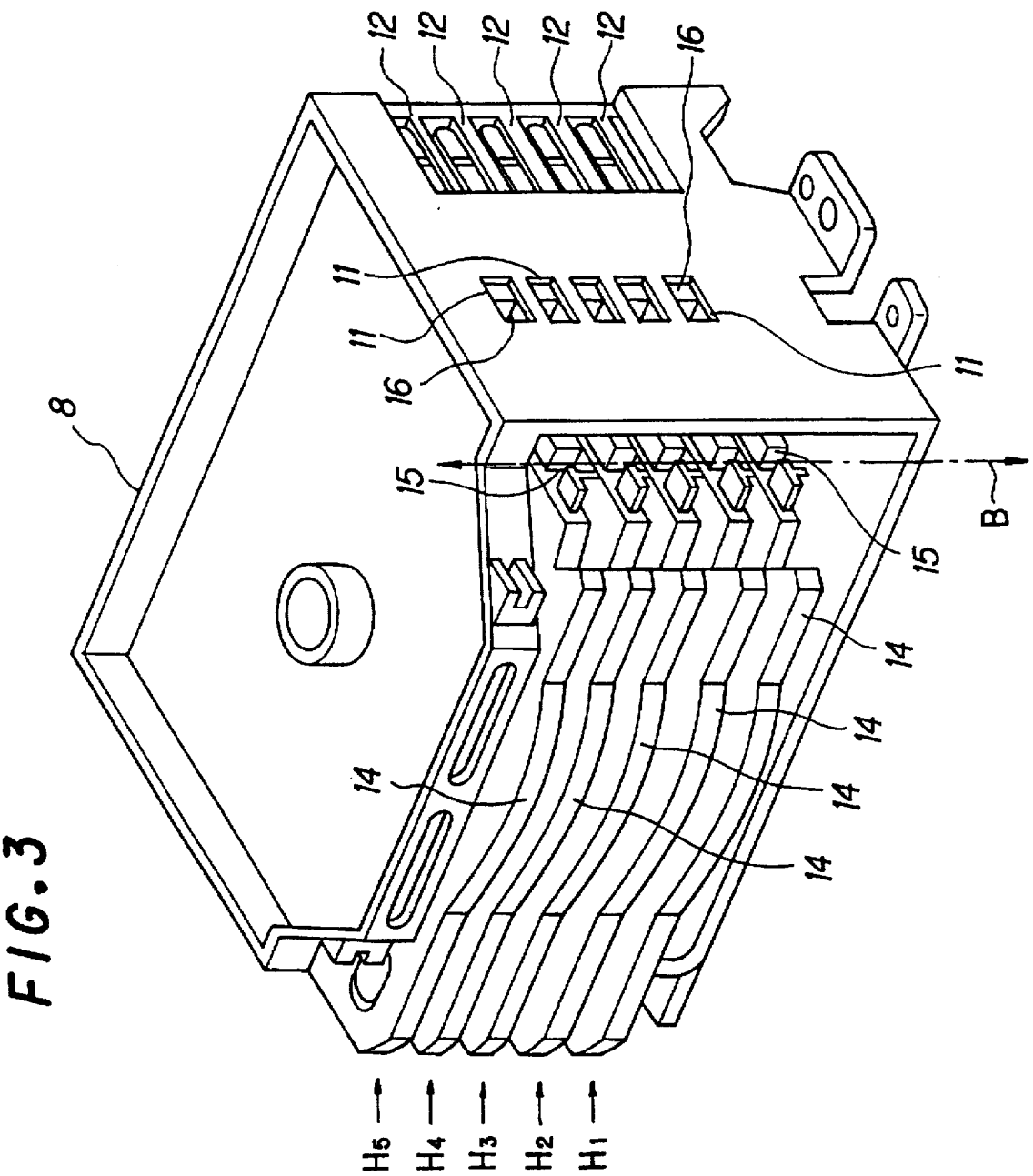
FIG. 3 is a perspective view showing a stocker used in the disc changer apparatus shown in FIG. 1.

The subtray 14 is accommodated or received in the stocker 8 as shown in FIG. 3. The stock positions of five subtrays 14 are predetermined, respectively. The withdrawal from the stocker 8 and reception to the stocker 8 with the main tray 75 are carried out at the stock positions which are first through fifth stock height positions $H_1$ to $H_5$.

Figure 4:
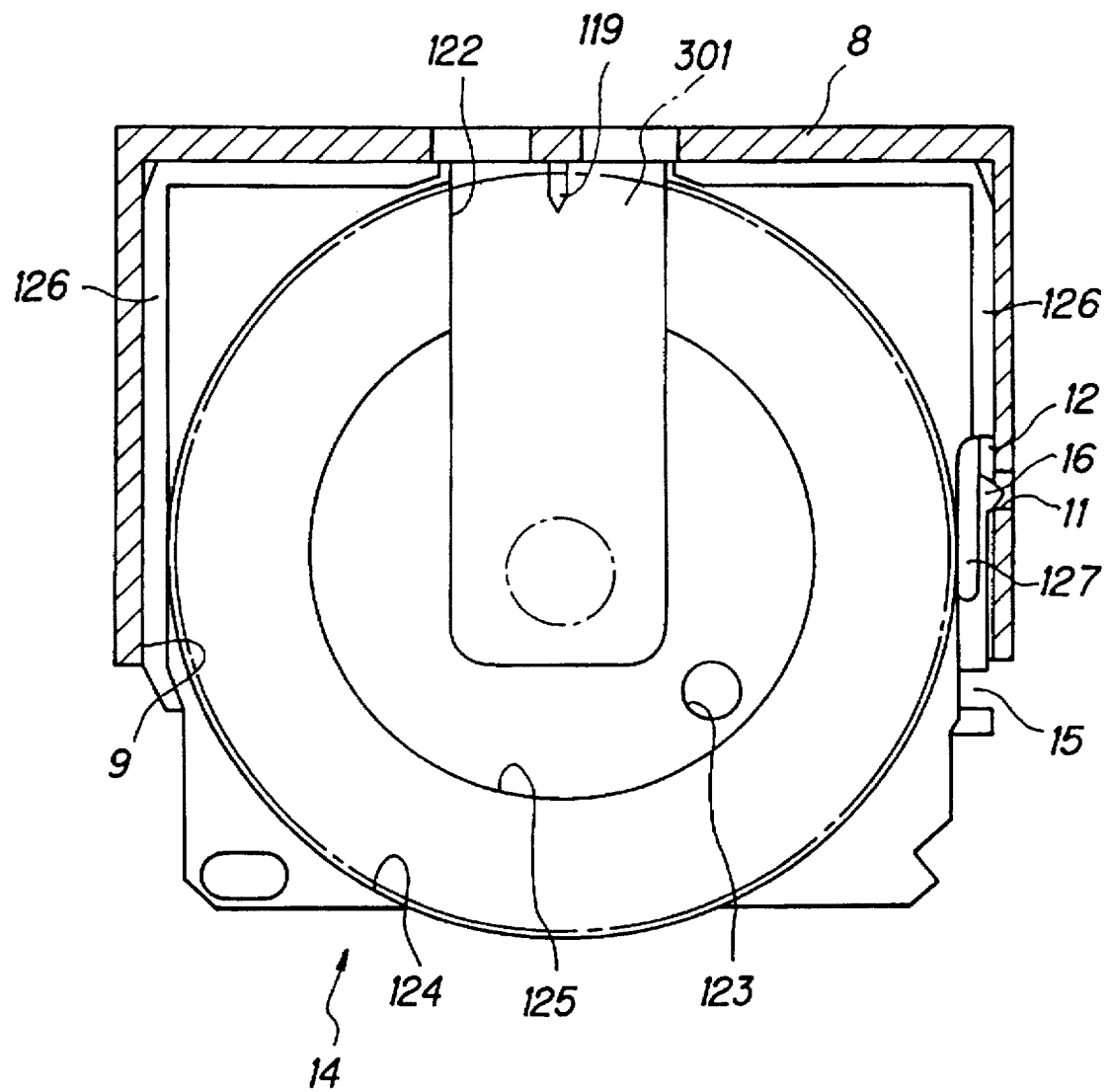
FIG. 4 is a sectional view showing the subtray received in the stocker shown in FIG. 1.

FIG. 4 shows the subtray 14 kept under the condition that it is accommodated in the stocker 8. An engagement recess portion 11 is formed at each stock position as best shown in FIG. 3, and shelf members 12 are provided for partitioning the respective stock positions. The subtray 14 is received with the jaw portions 126 being supported to the shelf member 12. Also, the subtray 14 is held in the fully received position with the projection portion 16 being engaged with the engagement recess portion 11 as shown in FIG. 4, so that the received position condition of the subtray 14 to the stocker 8 is maintained.

The projection portion 16 is inserted into the engagement recess portion 11 by the elastic deformation of the spring portion 127 during the returning operation of the subtray 14 into the stocker 8, and is removed away from the engagement portion 11 by the elastic deformation of the spring portion 127 during the withdrawal operation from the stocker 8. Incidentally, a reference numeral 119 denotes a projection formed to face the top surface of the disc 301 received on the subtray 14. The projection 119 is used for preventing the withdrawal of the disc from the large diameter recess portion 124 in the case where the subtray 14 is located in the stock position.

<3. Structure of main tray and slider and horizontal transferring operation>

Figure 5:
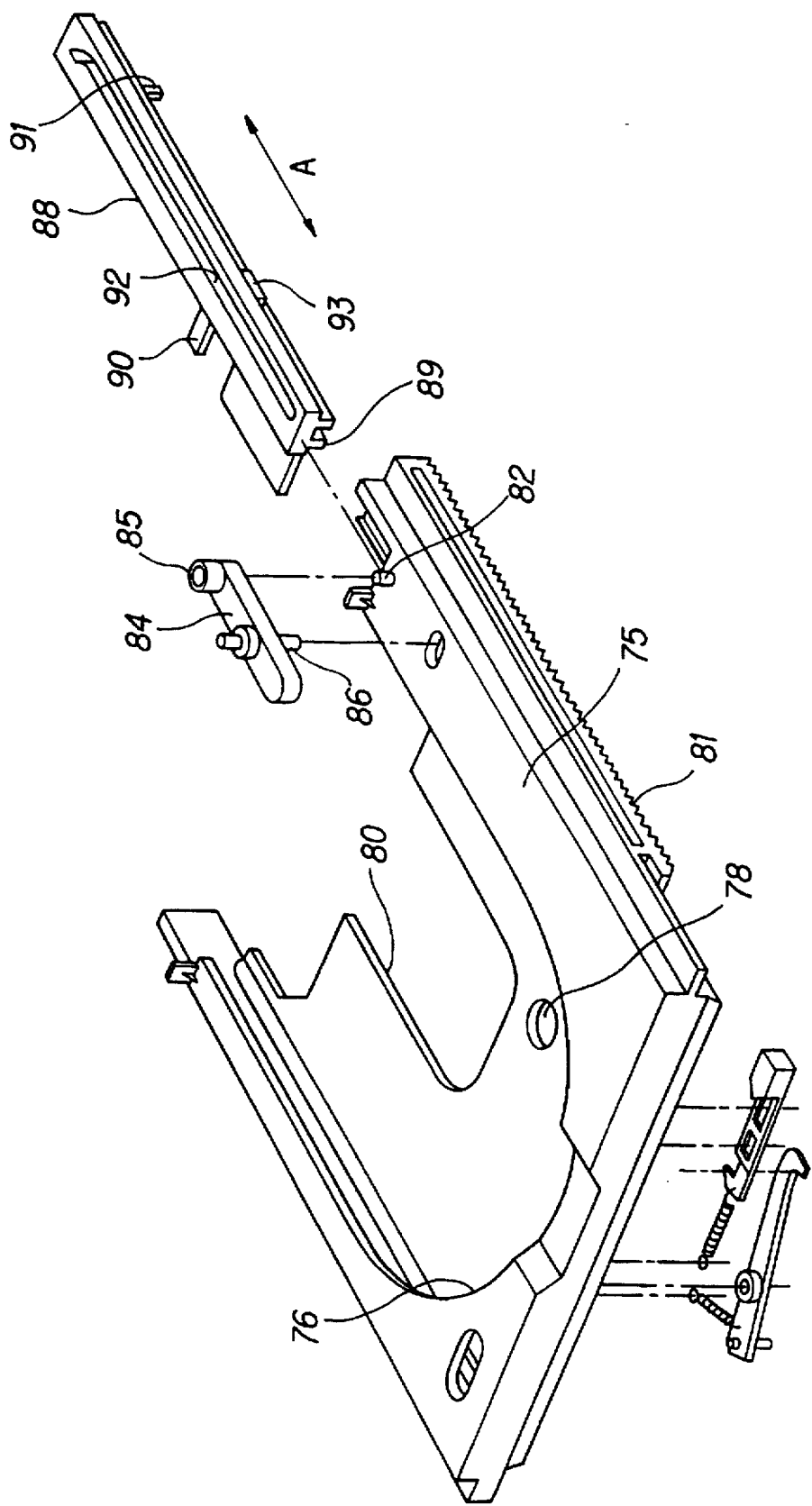
FIG. 5 is a perspective view showing a main tray and a slider used in the disc changer apparatus shown in FIG. 1.

FIG. 5 shows a main tray 75 and a slider 88. The main tray 75 is formed into a thin box-shape opened at central portions of top surface and bottom surface sides and on the rear side. The main tray 75 is structured so as to be insertingly engageable with the subtray 14 from the rear side.

A cutaway portion 76 which becomes an open part on the top surface side is used to cause the disc received on the subtray 14 to face the top surface side when the subtray 14 is inserted thereinto. With this structure, when the main tray 75 engaged with the subtray 14 is transferred to the eject position, the loading/unloading of the disc on the subtray 14 may be effected. A cutaway portion 80 which becomes an open part on the bottom surface side is used to cause the disc as well as the cutaway portion 122 of the subtray 14 to oppose to the optical head 7 and the disc table 6 when the main tray 75 into which the subtray 14 has been inserted is transferred to the loading position.

A reference numeral 78 denotes a sensor hole formed for a sensor operation to detect the presence/absence of the disc together with the sensor hole 123 of the subtray 14.

The slider 88 is received at one side portion of the main tray 75 under this condition it is movable in a direction indicated by an arrow A in FIG. 5. As a result of the movement, the subtray 14 is withdrawn relative to the main tray 75 and the subtray 14 is returned and accommodated in the stocker 8.

For this reason, the slider 88 is formed with an engagement projection 90 on a side edge portion inside the main tray 75. The engagement projection 90 is engaged with the engagement recess portion 15 of the subtray 14.

Figure 7:
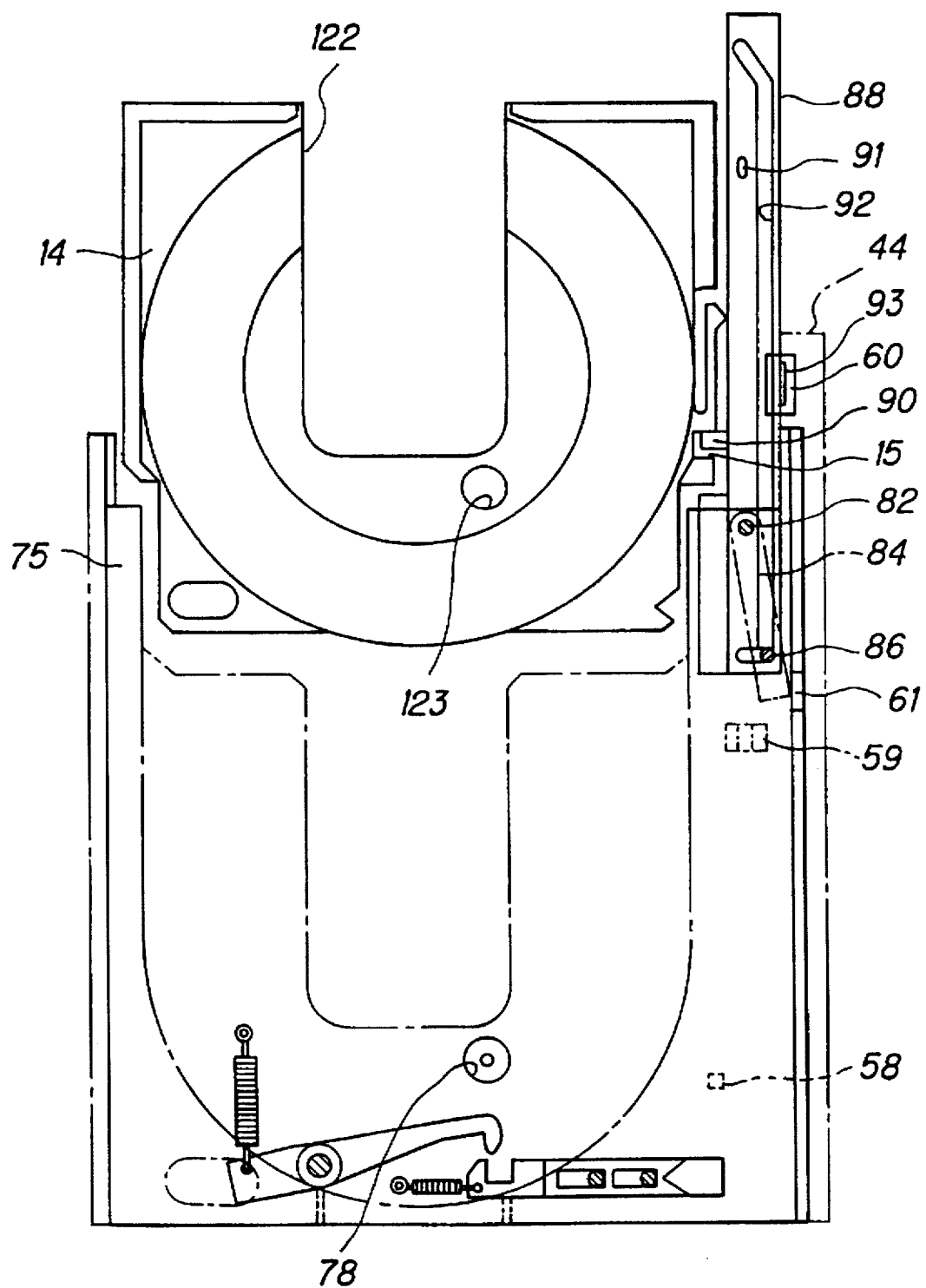
FIG. 7 is an illustration of a condition where the subtray is kept under the horizontal transferring operational condition of the disc changer apparatus shown in FIG. 1 before the reception in the main tray.

Namely, under the condition that the slider 88 is projected rearwardly from the main tray 75 as shown in FIG. 7, the engagement projection 90 is engaged with the engagement recess portion 15 of the subtray 14 accommodated at the stock position of the stock height position of the main tray 75 at that time. Under this condition, the slider 88 is drawn into the main tray 75 so that the subtray 14 is also drawn into the main tray 75 to take an insertion engagement condition shown in FIG. 8. Inversely, the slider 88 is drawn rearwardly of the main tray 75 from the condition shown in FIG. 8 so that the subtray 14 is also drawn rearwardly and is returned and accommodated in the stocker 8.

Incidentally, under the condition that the subtray 14 is not inserted into the main tray 75 and the slider 88 is not drawn out, since the engagement projection 90 and the engagement recess portion 15 are of course not engaged with each other, the engagement condition has to be first attained when the subtray 14 is to be transferred from the stocker 8.

For this reason, the main tray 75 is firstly transferred to the loading position close to the optical head 7, and at this position, the slider 88 is drawn rearwardly. Since this position is lower than the position of the stocker 8, there is no interference with the drawing operation of the slider 88.

Under the condition that the slider 88 is drawn, the transferring operation of the main tray 75 in the vertical direction is attained to a stock height position where the subtray 14 to be picked up from the stocker 8 is received. During the vertical transferring operation, the engagement projection is caused to pass through the engagement recess portion 15 of each subtray 14 as indicated by a one-dot and dash line B in FIG. 3.

Accordingly, when the main tray 75 is transferred to a predetermined stock height position, the engagement projection 90 is located within the engagement recess portion 15 of the subtray 14 accommodated in the stock position. Accordingly, as shown in FIGS. 8 and 9, the retraction/withdrawal of the subtray 14 is possible in accordance with the movement of the slider 88.

<4. Structure of elevator block and horizontal transferring operation>

Figure 6:
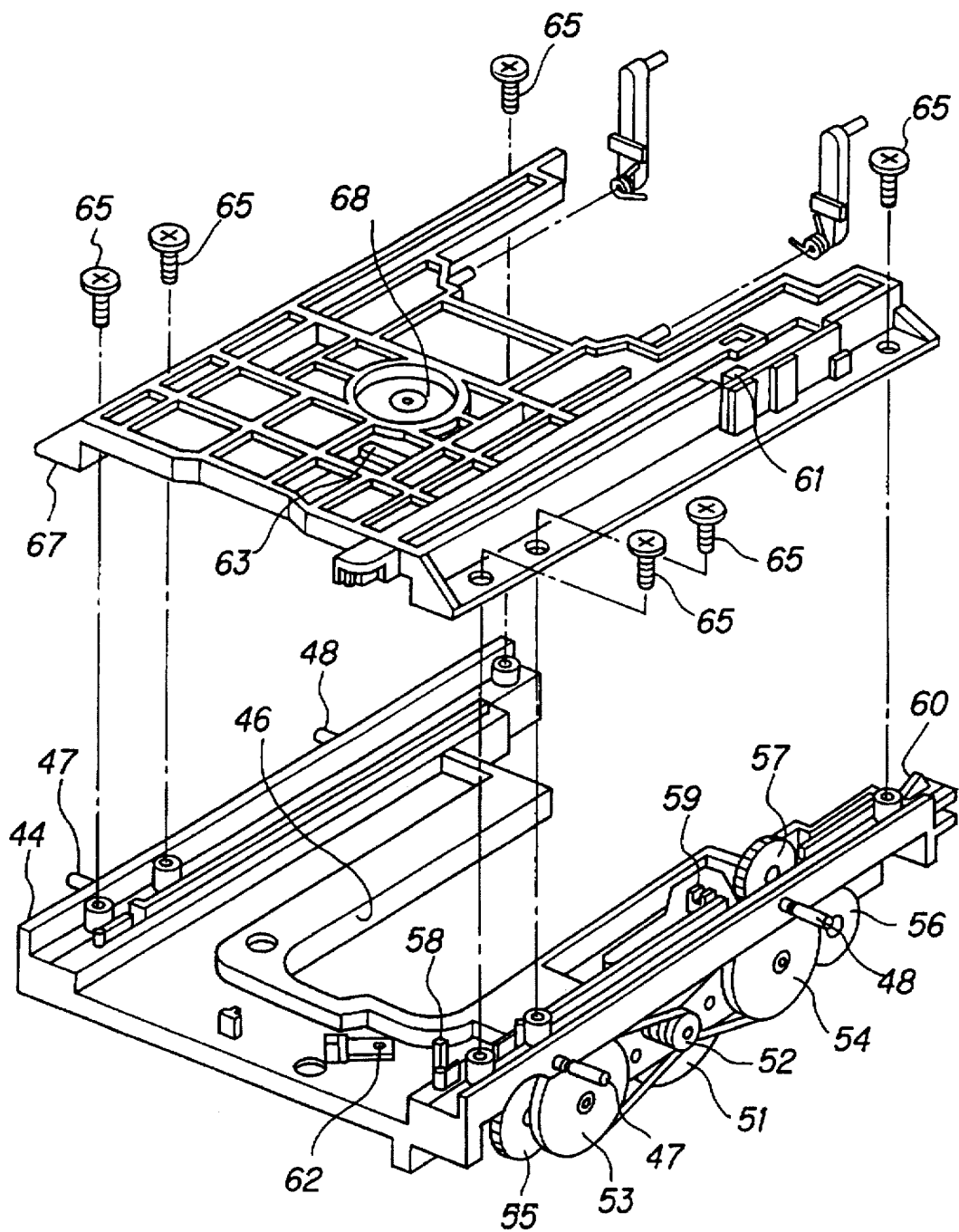
FIG. 6 is a perspective view showing an elevator block of the disc changer apparatus shown in FIG. 1.

FIG. 6 shows an elevator block. As described above, the elevator block is composed of the elevator block top 67 and the elevator block base 44. The main tray 75 is received in a space defined by the elevator block top 67 and the elevator block base 44. The main tray 75 may be drawn out forwardly (eject position) from the elevator block.

Figure 8:
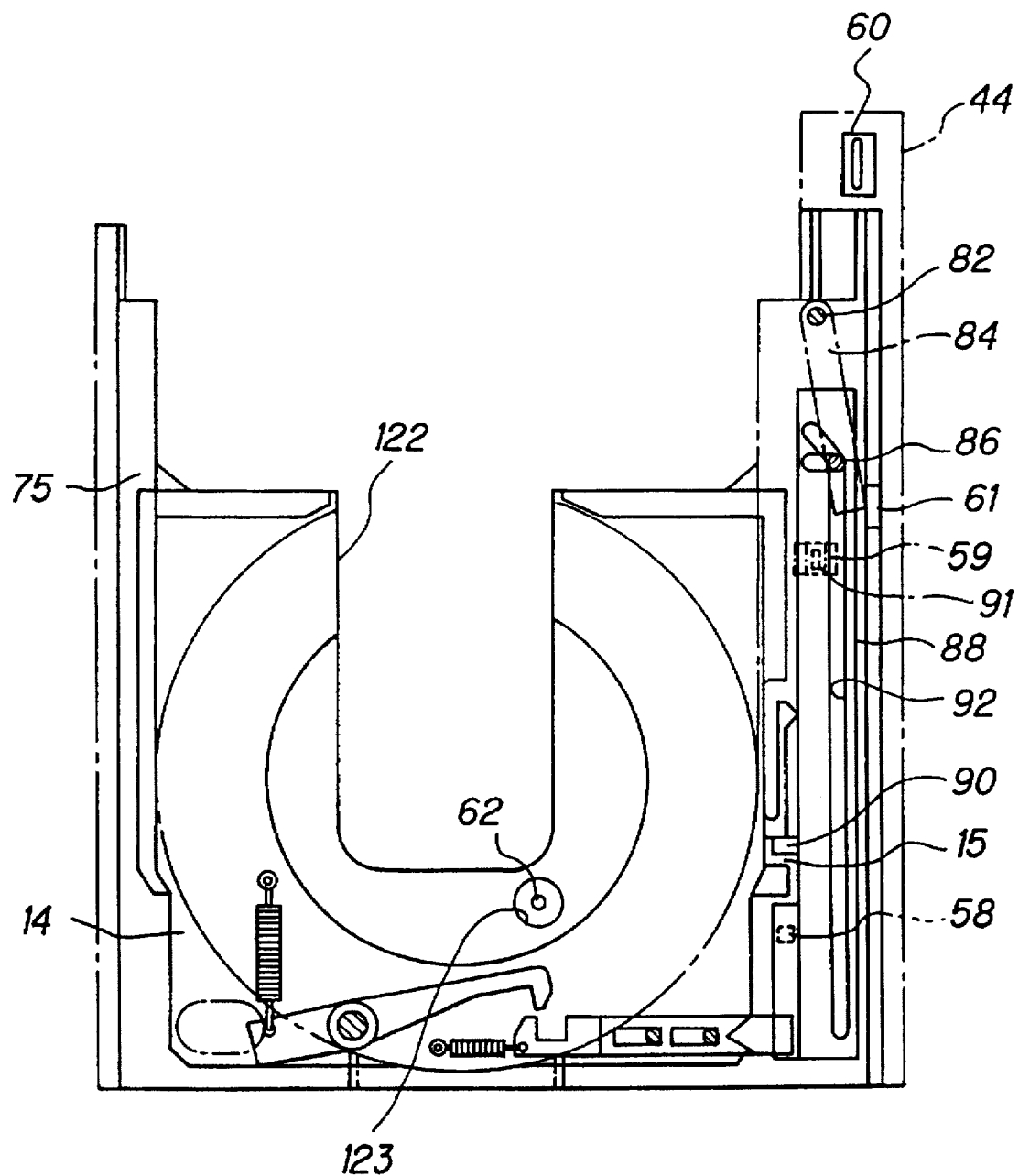
FIG. 8 is an illustration of a condition where the subtray is kept under the horizontal transferring operational condition under the reception in the main tray.
Figure 9:
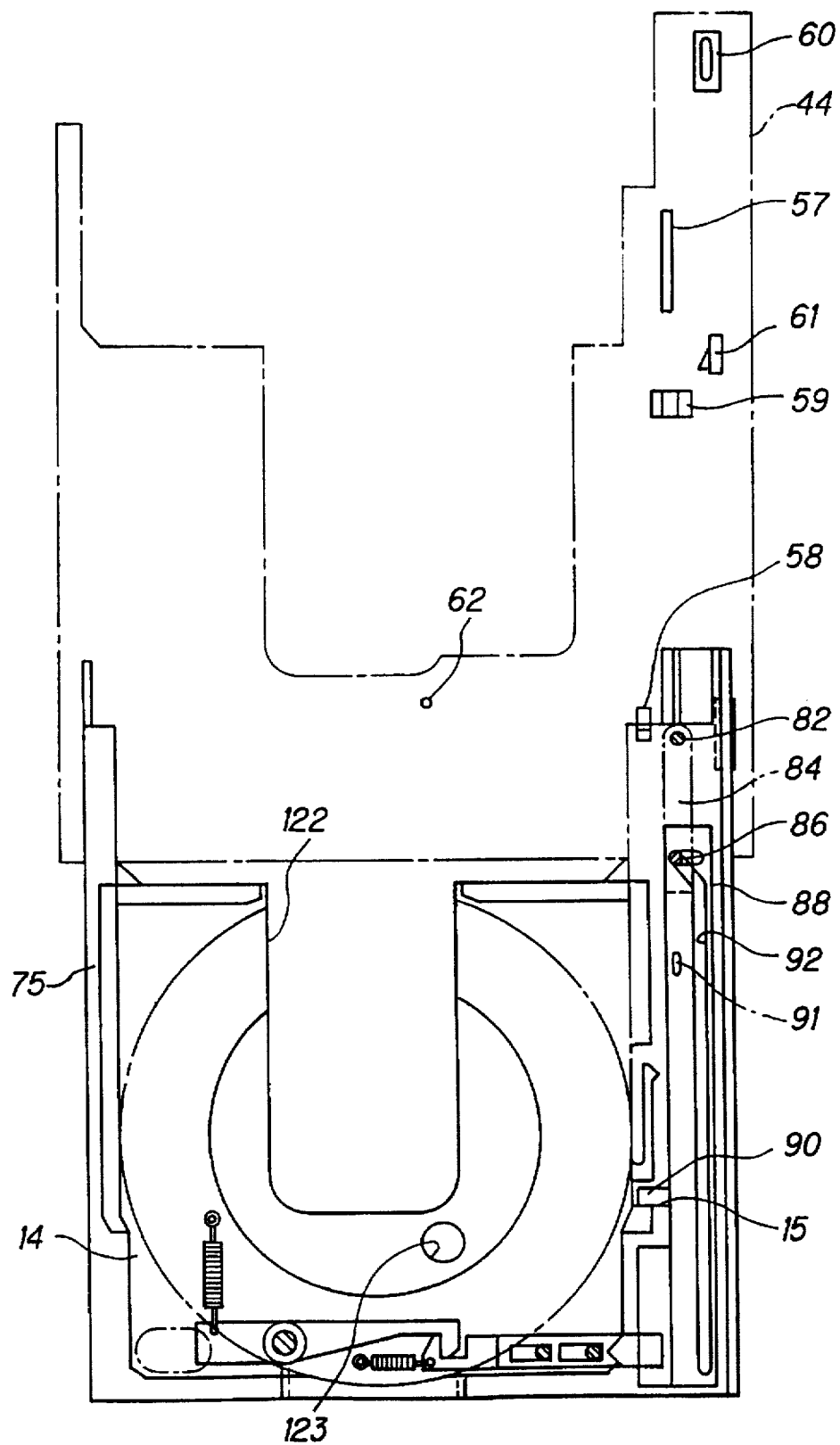
FIG. 9 is an illustration of a condition where the subtray is kept under the horizontal transferring operational condition and is moved to the eject position together with the main tray.

The condition where the main tray 75 is received in the elevator block is the condition shown in FIGS. 7 and 8 where the elevator block base 44 is indicated by one-dot and dash line.

Then, from the condition of FIG. 8, the main tray 75 (and the subtray 14) is drawn to the eject position as shown in FIG. 9.

A chucking plate 68 is formed in the elevator block top 67. Under the condition that the elevator block is lowered to the loading position, the disc received on the subtray 14 received in the main tray 75 within the elevator block is clamped and chucked between the chucking plate 68 and the disc table 6.

The cutaway portion 46 of the elevator block base 44 allows the disc to oppose to the optical head 7 and the disc table 6.

A horizontal transferring motor 51 is mounted on the elevator block base 44 for the above-described movement of the slider and the movement of the main tray 75 (i.e., transferring operation in the horizontal direction). The drive force of the horizontal transferring motor 51 is transmitted from a drive pulley 52 to driven pulleys 53 and 54. The rotation of the driven pulley 53 causes the pinion gear 132 shown in FIG. 11 to rotate through a gear 55. Although its detailed explanation will be omitted, the pinion gear 132 is engaged with a rack gear 81 of the main tray 75 shown in FIG. 5 when the eject operation (open/close) is carried out. By this operation, the main tray 75 is moved between the reproducing position where it is received in the elevator block and the eject position.

The rotation of the driven pulley 54 is transmitted to a pinion gear 57 through a gear 56. Although its detailed explanation will be omitted, the pinion gear 57 is engaged with a rack gear 89 of a lower portion of the slide 88 when the main tray 75 is in the reproducing position (elevator block reception state). By this operation, the movement of the slider 88, i.e., the horizontal movement of the subtray 14 is carried out.

<5. Vertical transferring operation by cam plates>

Figure 10:
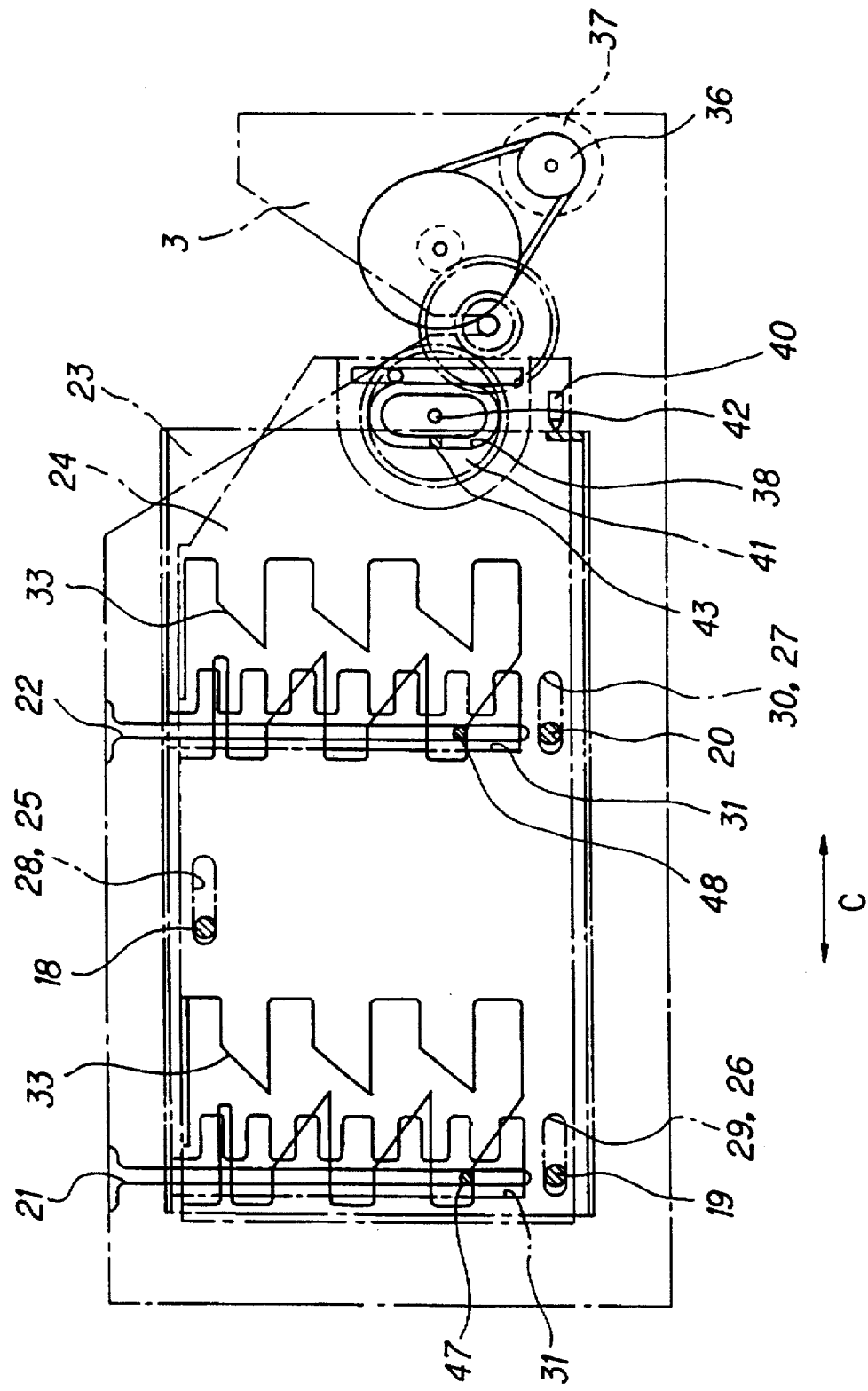
FIG. 10 is an illustration of a structure of a vertical transferring mechanism of the disc exchanger apparatus shown in FIG. 1.

FIG. 10 shows the state of the first and second cam plates 24 and 23 mounted on the chassis 1.

As described above, the first and second cam plates 24 and 23 are mounted under the condition that it may be moved within the ranges defined by the oblong holes of the support slits 28, 29 and 30 and the support slits 25, 26 and 27 relative to the chassis. This back-and-forth movement operation is attained by a up-and-down motor 37 for executing the upward and downward operation of the elevator block. The drive force of the up-and-down motor 37 is transmitted to the cam gear 41 through a gear train from a drive pulley 36. An oblong cam groove 38 is formed in a cam gear 41 and a follower pin 43 implanted in the second cam plate 23 is engaged with the cam groove 38. Thus, the second cam plate 23 takes two reciprocating motions in the back-and-forth direction indicated by an arrow C for every one rotation of the cam gear 41.

The support pins 47 and 48 of the elevator block base 44 are inserted into the cam hole 31 of the second cam plate 23 and the cam groove 33 of the first cam plate 24. By the reciprocating motion of the second cam plate 24, the support pins 47 and 48 are moved up and down within the cam grooves 33 formed in zigzag shapes while being guided by the cam holes 31. Namely, thus, the up-and-down operation of the elevator block is carried out. Incidentally, the rotations of the up-and-down motor 37 are opposite to each other in the ascending operation and the descending operation.

Figure 11:
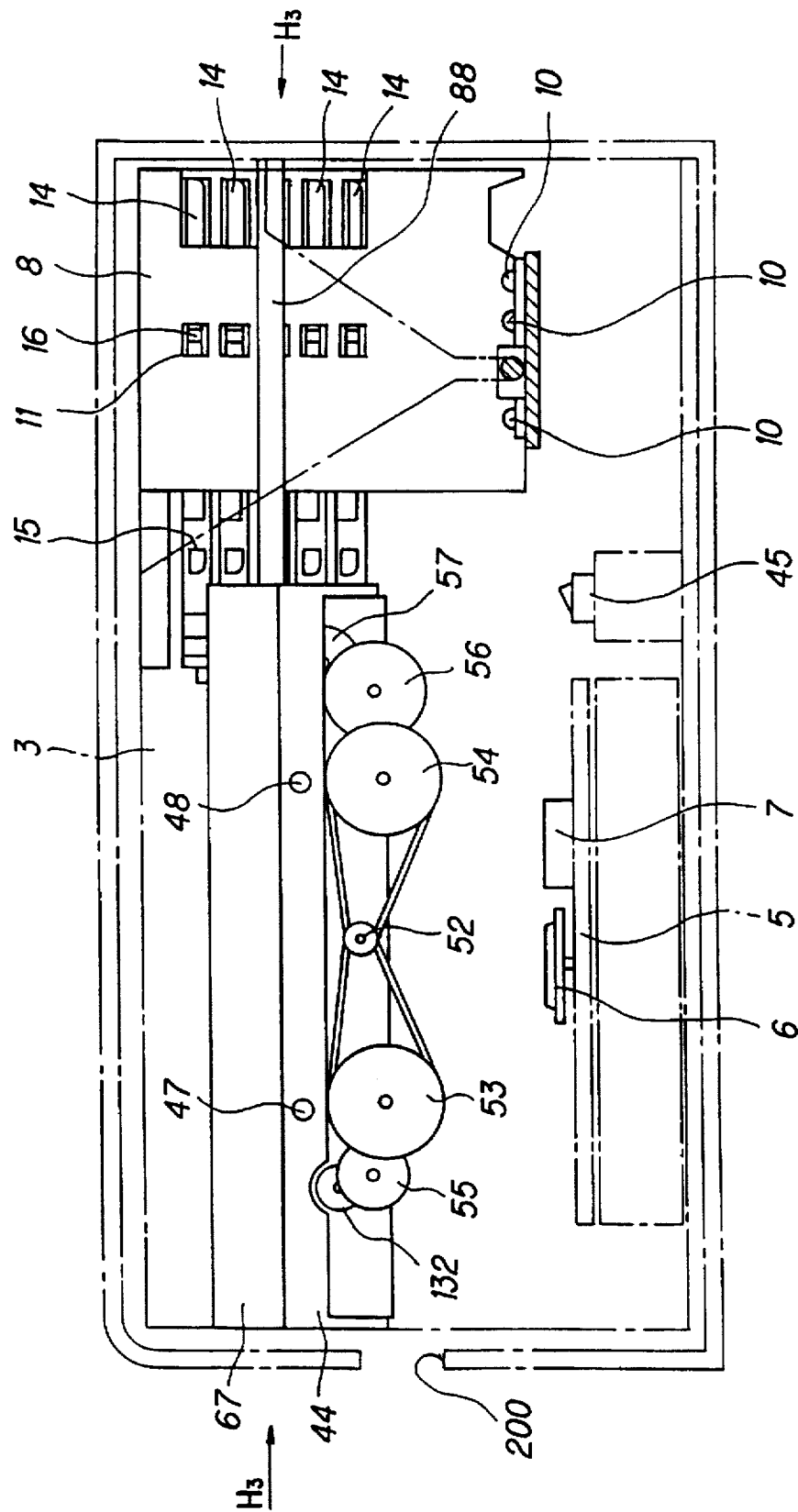
FIG. 11 is an illustration of the vertical transferring operational condition of the disc changer apparatus shown in FIG. 1, showing a condition that the subtray is drawn out.
Figure 12:
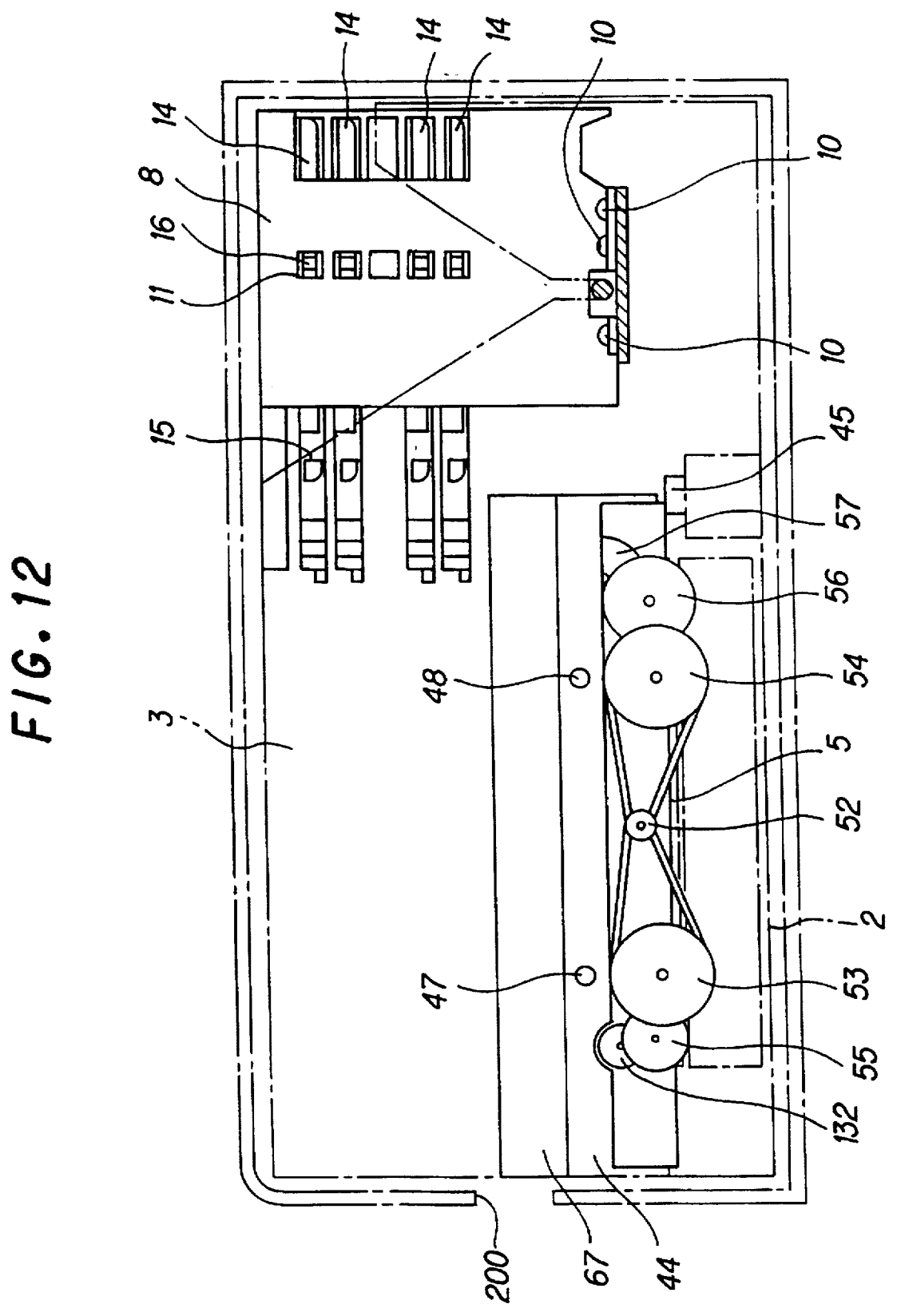

FIG. 12 shows a state where the elevator block is in the loading position for enabling the reproducing operation by the disc drive section 5 as the ascending/descending operation of the elevator block. Also, FIG. 11 shows a state where the elevator block is in the third stock height position $H_3$ at which the third subtray 14 is drawable or retractable relative to the stocker 8.

<6. Sensor for horizontal transference condition>

Figure 13:
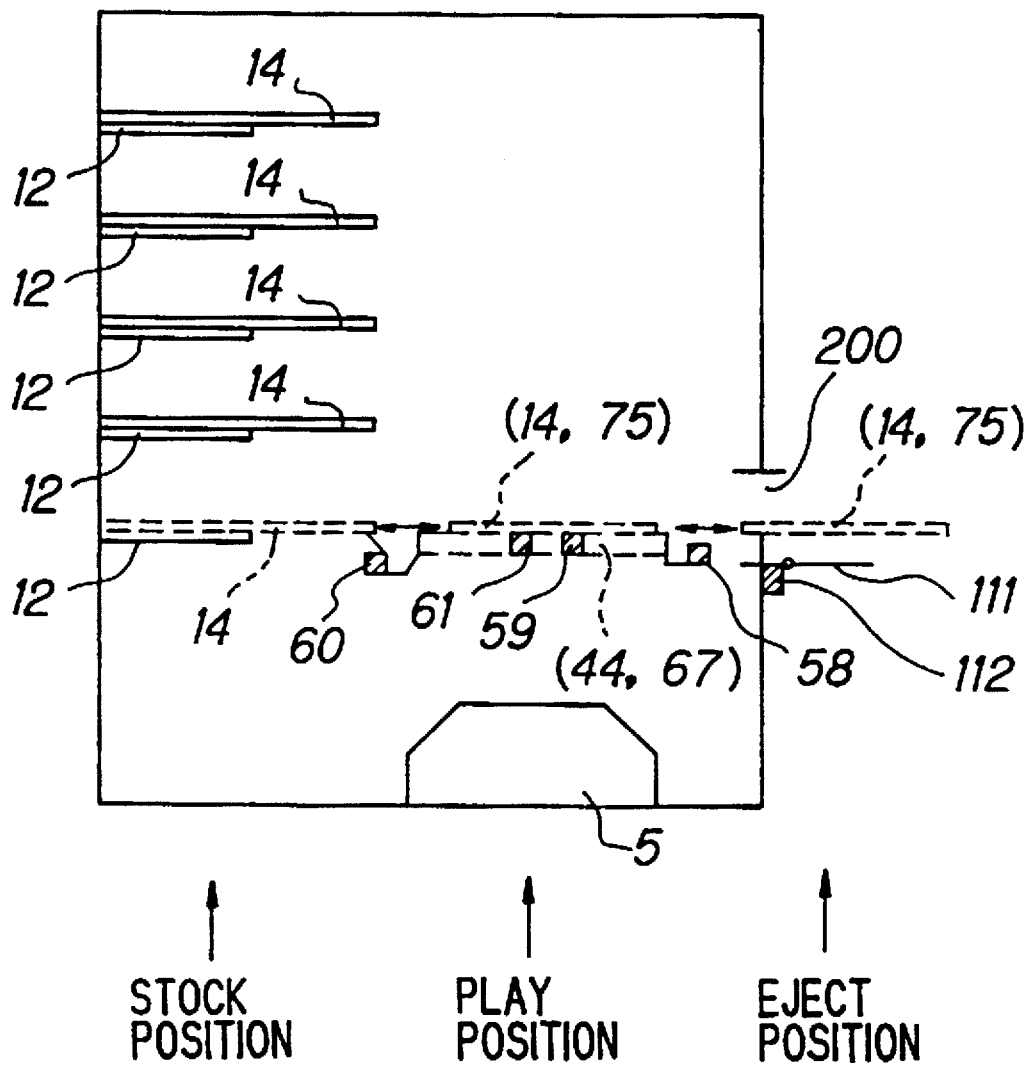
FIG. 13 is a schematic view showing the horizontal transferring operation of the disc changer apparatus shown in FIG. 1.
Figure 14:
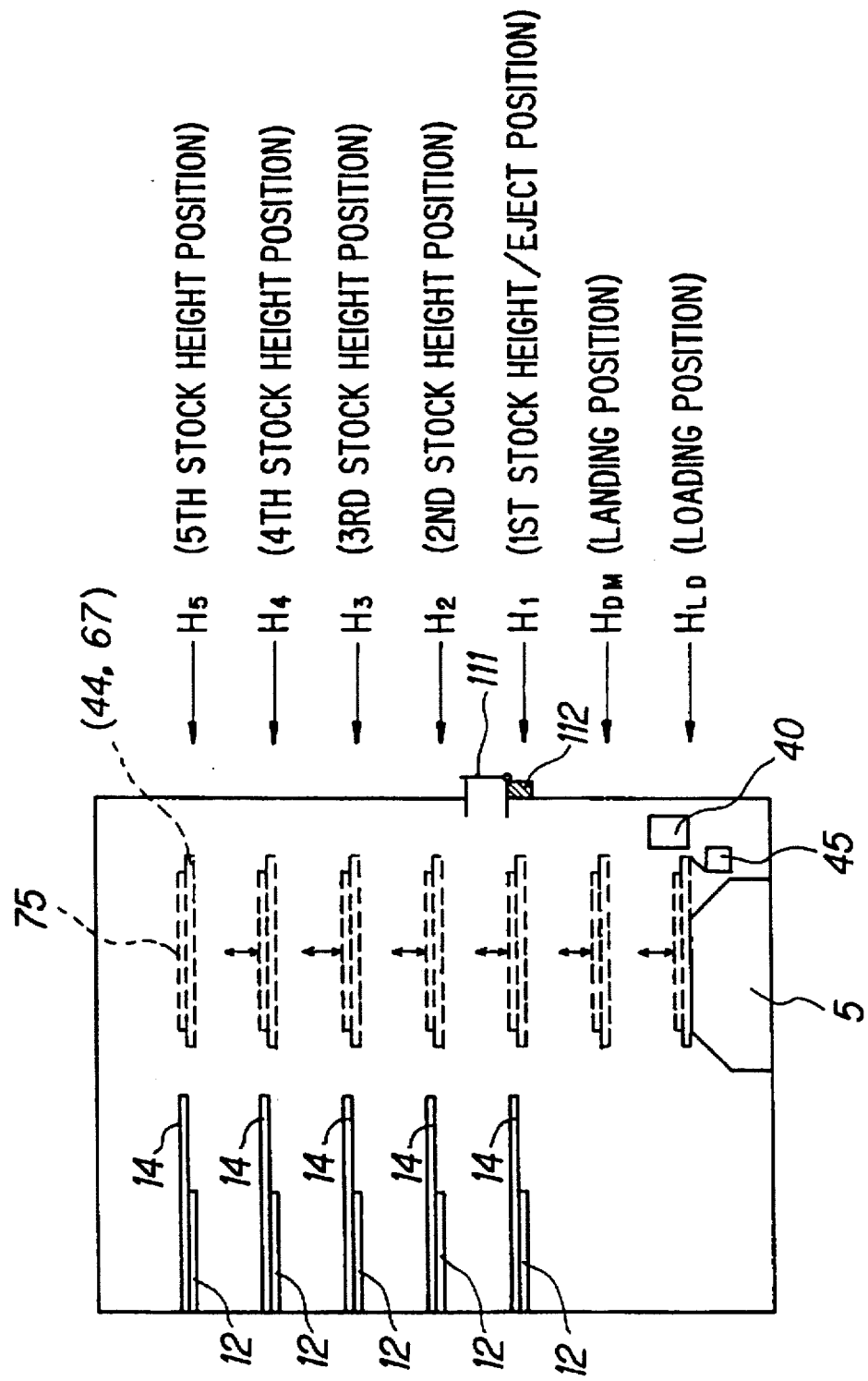
FIG. 14 is a schematic view showing the vertical transferring operation of the disc changer apparatus shown in FIG. 1.

If the transferring operation of the changer apparatus having such a structure is schematically shown, the movement among the three transferring positions in the horizontal direction as shown in FIG. 13 and the seven transferring positions in the vertical direction as shown in FIG. 14 are carried out.

Four sensor are provided for absolutely detecting the condition that the subtray 14 is in any one of the three transferring positions, i.e., the stock position/play position/eject position in the horizontal direction.

The four sensor means are located on the elevator block as shown in FIG. 6 and are four switches, i.e., a photo interrupter 59, a stock detecting switch 60, an open/close switch 58 and an out-switch 61.

The photo interrupter 59 is disposed on the elevator block base 44 for detecting a detected projection 91 projected from a bottom surface portion of the slider 88 shown in FIG. 5.

The photo interrupter 59 is turned on when the slider 88 is retracted into the main tray 75 and the subtray 14 is in the reproducing position and turned off except for this condition.

The out-switch 61 is disposed on the elevator block top 67 for detecting an angular position of a lock lever 84 relative to the slider 88. Although the detailed explanation of the lock lever 84 will be omitted, the lock lever 84 is used for preventing the movement of the slider 88 in the case where the main tray 75 is located between the approximate play position and the eject position and is rotated while a bearing 85 is supported to a pivot projection 82. A projection 86 on the bottom surface side is engaged with a groove 92 of the slider 88 and the rotational operation of the lock lever 84 is carried out in accordance with the movement position of the slider 88.

Namely, the rotation of the lock lever 84 is carried out between the case where the slider 88 is received in the interior of the main tray 75 and the case where it is drawn out of the main tray 75. As a result, the out-switch 61 is switched on and off during the period from the stock position to the reproducing position of the subtray 14 and the case where the subtray 14 is received in the interior of the main tray 75 (i.e., in the play position or the eject position).

The stock detecting switch 60 is provided at a rear end portion of the elevator block base 44. The stock detecting switch 60 is turned on by a pressure projection 93 formed on the slider 88 in the positional condition in which the slider 88 transfers the subtray 14 to the stock position. Namely, it detects that the transferring position in the horizontal direction is the stock position condition.

The open/close switch 58 is provided in the vicinity of the front end portion of the elevator block base 44 and is depressed by the main tray 75 during a period when the main tray 75 is transferred from the reproducing position to the eject position relative to the elevator block.

Figure 15:
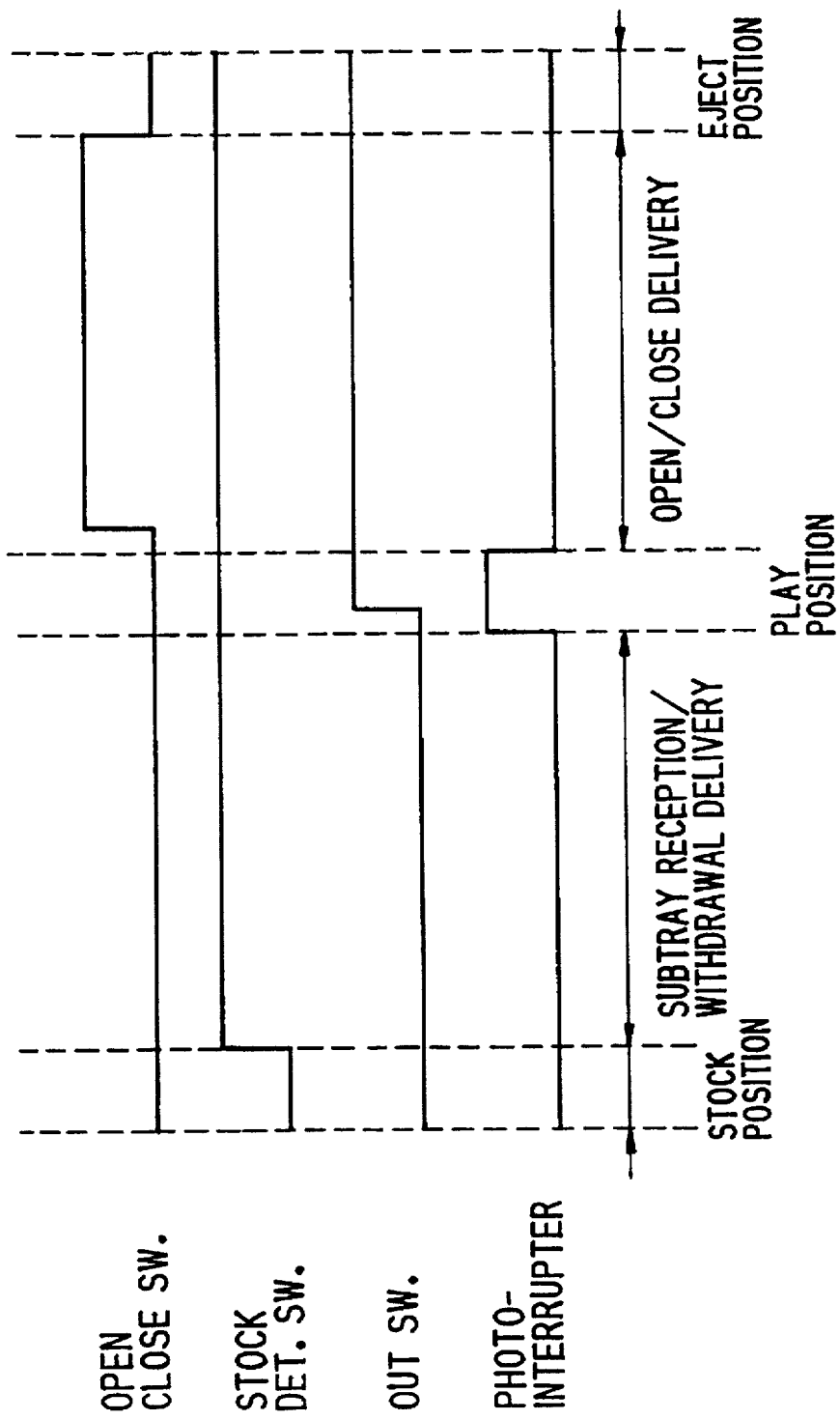
FIG. 15 is a timing chart of detection signals of the horizontal operation of the disc changer apparatus shown in FIG. 1.

The outputs of the four sensor means are shown in FIG. 15. By these signals, it is possible for the controller (to be described later) to always currently judge how the transferring condition is in the horizontal direction.

<7. Sensor for presence/absence of disc>

An emission element, such as light source 62, is provided on the elevator block base 44, whereas a light reception element, such as a photodetector 63, is provided on the elevator block top 67. The light emission element 62 and the light reception element 63 are arranged to face each other. These elements function as a sensor for detecting the presence/absence of the disc on the subtray 14.

Namely, when the main tray 75 into which the subtray 14 is inserted for engagement is received within the elevator block, the sensor hole 78 of the main tray 75 and the sensor hole 123 of the subtray 14 are located on the vertical line which reaches the light reception element 63 from the light emission element 62. Namely, the interval between the light emission element 62 and the light reception element 63 is not interrupted by the subtray 14 and the main tray 75.

Accordingly, if the disc is not loaded on the subtray 14, the output light of the light emission element 62 is received by the light reception element 63. Also, when the disc is present, the light is not received. Therefore the output of the light reception element 63 is outputted as information representative of the presence/absence of the disc to the controller (to be described later).

The sensor composed of the light emission element 62 and the light reception element 63 for the disc presence/absence is provided at a position close to the center of the subtray 14 and the main tray 75, so that not only the detection operation of the disc presence/absence during the transference from the eject position to the reproducing position but also the disc presence/absence detection during the transference from the stock position to the reproducing position may be carried out.

Namely, according to the sensor of the disc presence/absence, only by simply drawing each subtray 14 within the subtray into the main tray 75, is it possible to detect whether or not the disc is received on the subtray 14. Accordingly, when the disc loading condition of each subtray is to be detected, it is unnecessary to carry out time-consuming and troublesome operations as by delivering the subtrays 14 one by one to the loading position and chucking it, carrying out a TOC data readout operation with the optical head 7 and judging the presence/absence of the disc in accordance with the result (whether or not the TOC is read or not). Thus, it is possible to carry out a rapid detection of the disc receiving state within the stocker 8 and a rapid correspondence operation in case of the absence of the disc.

For example, in the case where the subtray on which no disc is loaded is designated and the reproducing operation is effected by the user, since the disc absence is noticed at the time when the subtray 14 is drawn into the main tray 75, the correspondence operation such as a display of it may be quickly performed.

<8. Sensor for vertical transferring condition>

In the vertical transferring operation of the transferring mechanism of the disc changer apparatus, as shown in FIG. 14, it carries out the movement among the loading position $H_{LD}$, the landing position $H_{DM}$, and the first through fifth stock height positions $H_1$ to $H_5$. Two sensors, i.e., an initial switch 45 and a count switch 40 are provided for detecting the seven transferring positions in the vertical direction.

The initial switch 45 is provided so as to be depressed when the elevator block is lowered to the loading position $H_{LD}$ (lowermost position) as shown in FIGS. 11 and 12. Namely, the initial switch 45 is means for detecting the absolute address representative of the loading position $H_{LD}$.

As shown in FIG. 10, the count switch 40 is disposed at a position where it may be depressed by a contact portion 42 of the second cam plate 23 and is turned on or off by the above-described back-and-forth operation of the second cam plate 23.

Namely, the elevator block is elevated or lowered step by step by the back-and-forth movement of the second cam plate 23, and the switching operation is carried out in correspondence with the one-step ascending/descending operation. The count switch 40 serves as a means for detecting the relative address representative of the one-step ascending/descending operation.

Figure 16:
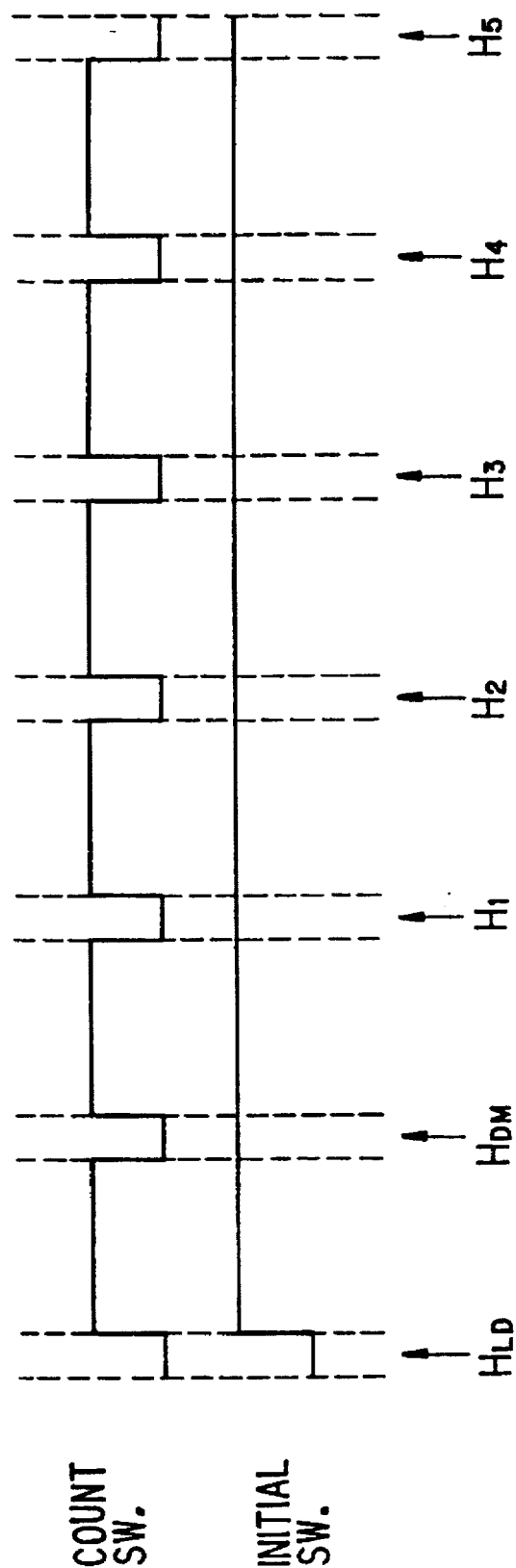
FIG. 16 is a timing chart of detection signals of the vertical operation of the disc changer apparatus shown in FIG. 1.

The outputs of the initial switch 45 and the count switch 40 are shown in FIG. 16.

In the loading position $H_{LD}$, the absolute position is detected by the output of the initial switch 45. When the ascending/descending operation is carried out, since a switching pulse of the count switch is obtained for every one step, the increment of the counter is performed by the switching pulse upon the ascending operation and the decrement of the counter is performed by the switching pulse upon the descending operation based upon the initial position of the loading position $H_{LD}$. Thus, it is possible to judge the current vertical address of the elevator block.

By thus detecting the transferring positions in the height direction only with the initial switch 45 and the count switch 40, the economical advantage is considerably enhanced in provision of the sensors in comparison with the provision of a sensor for every transferring position of the seven positions. Also, in this system, it is advantageous that the number of the sensors may be only two even in the case where the steps of the transference are increased (for example, in the case where a larger number of discs may be received).

<9. Structure of changer apparatus>

The overall circuit block of the changer mechanism according to the embodiment will now be explained.

Figure 17:
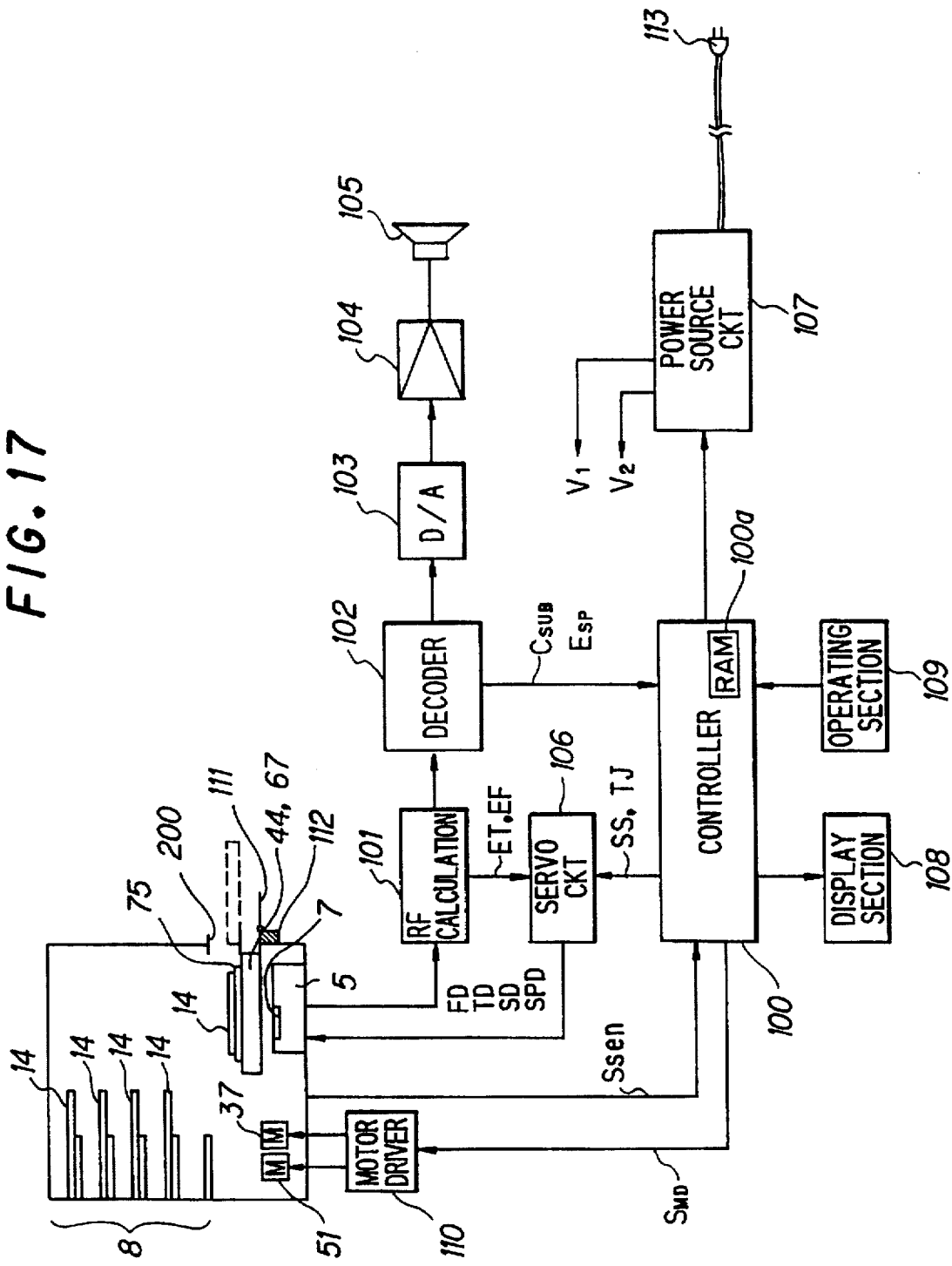
FIG. 17 is a block diagram showing a structure of the disc changer apparatus.

FIG. 17 is a block diagram showing the changer apparatus. In the above-described changer mechanism, the disc which has been transferred to the loading position is drivingly rotated at CLV (Constant Linear Velocity) manner by the spindle motor and its recorded information is read out by the optical head 7.

Namely, the light beam that has been radiated from a laser diode of the optical head 7 is converged on a recording surface of the disc by an objective lens through an optical system including a diffraction grating, a beam splitter, a ¼ wavelength plate and the like. The reflected light beam from the recording surface of the disc is passed through the optical system of the beam splitter and is converted to a photodetector through a cylindrical lens or the like to be converted into an electrical signal.

A reference numeral 101 denotes an RF calculation section to which the output signal from the photodetector of the optical head 7 is supplied and produces an RF signal as reproducing data, a focus error signal EF and a tracking error signal ET by an arithmetic calculation process.

The focus error signal EF and the tracking error signal ET are supplied to a servo circuit 106. The servo circuit 106 generates a focus drive signal FD and a tracking drive signal TD and supplies an actuator for driving the objective lens of the optical head 7. The objective lens of the optical head 7 is moved in a focusing direction and a tracking direction by the actuator according to the focus drive signal FD and the tracking drive signal TD.

Also, a sled drive signal SD is produced on the basis of the tracking error signal ET and is fed to a slid mechanism for driving the optical head 7 in the radial direction of the disc.

The RF signal outputted from the RF calculation section 101 is supplied to a decoder 102 and is subjected to an EFM decoding and an error correction process. It is converted into an analog audio signal (L, R) in a D/A converter 103 to be outputted from a speaker 105 through an amplifier 104 as a sound.

Also, in the decoder 102, a subcode data $C_{SUB}$, a clock error signal $E_{SP}$ for the spindle motor, and the like are extracted and supplied to a controller 100.

The controller 100 is composed of a microcomputer, to which the output signals from the respective switches 60, 58, 61, 40 and 45 are supplied and to which the output signals from the photo interrupter 59 and the light reception element 63 of the disc presence/absence sensor, for controlling each parts in correspondence with the user operation or the subcode data $C_{SUB}$. A spindle servo signal SS is supplied to the servo circuit 7, a spindle drive signal SPD is applied to the spindle motor, the servo circuit 7 is controlled by a track jump signal (jump pulse) TJ, and the access operation of the optical head 7 is executed.

A reference character 100a denotes a RAM incorporated into the controller 100 (which RAM may be a discrete unit). The TOC data read out from each disc are stored in the RAM 100a. In the case where the user carries out a program designation input in a program playback mode, the input data (music order) are stored therein.

A reference numeral 109 denotes an inputting operating section with various operating keys provided on a front panel of a cabinet of the apparatus, including operating keys for a loading/unloading or the like for the discs (subtrays 14) relative to the changer mechanism, operating keys such as play, stop, fast forward, fast rewind, AMS keys, and playback or reproducing mode operating keys such as random playback and program playback keys. Also, an operating switch of a user power source operation is also provided.

Figure 18:
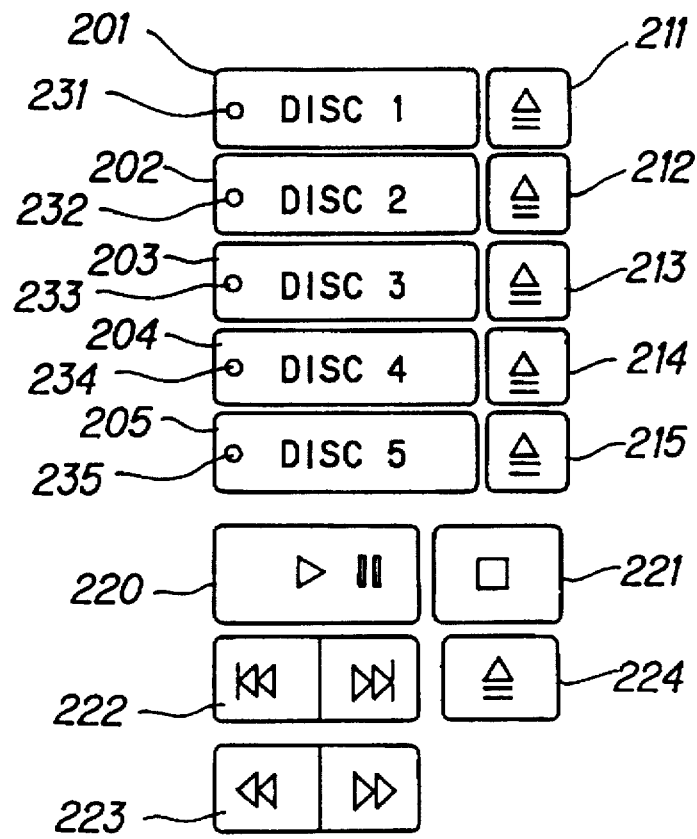
FIG. 18 is an illustration of a structure a part of a display section and an operating section of the disc changer apparatus.

The above-described operating keys are arranged as shown in, for example, FIG. 18. Namely, the play key (and a temporary stop key) 220, the stop key 221, the fast forward/fast rewind key 223, the AMS key 222 and the open/close key 224 are provided for operation of the disc which has now been transferred by the subtray 14, transferred to, for example, the loading position and is kept under the reproduction condition.

Also, disc selection key 201 to 205 are provided as indicated by "DISC 1" to "DISC 5" so that the disc accommodated in the stocker 8 may be directly selected to be reproduced by manipulating any one of the keys 201 to 205. For instance, in the case where the disc selection key 201 is depressed, the disc stocked at the stock height position $H_1$ is transferred to the loading position $H_{LD}$ to be reproduced.

The disc selection open/close keys 211 to 215 are provided in juxtaposed relation with the disc selection keys 201 to 205 for directly selecting the subtray 14, transferring it to the eject position and also transferring it from the eject position to the interior of the apparatus. For instance, if the disc selection open/close key 211 is depressed, the subtray 14 of the stock height position $H_I$ is ejected and the disc relative to the subtray may be loaded/unloaded.

A reference numeral 108 in FIG. 17 denotes a display section. In the display section 108, information such as time information of the disc which is now being reproduced and various mode conditions are displayed on the basis of the control of the controller 100.

Subtray display sections 231 to 235 made of LEDs are provided on the disc selection keys 201 to 205 as shown in FIG. 18 as parts of the display section 108 so that it is possible to judge the condition of each subtray in accordance with the display condition of the subtray display sections 231 to 235.

For example, by the display condition of the subtray display sections 231 to 235, the user can confirm whether or not the disc is held on the subtray, whether or not the subtray is retained in the stocker, or whether or not the subtray is one to be transferred, i.e., the disc on the subtray is kept under the reproduction stand-by condition.

For example, in the case where the disc is received on the subtray, the subtray display section corresponding to the subtray is turned on and radiates a red colored light beam, and in the case where the disc is not laid thereon, the subtray display section is turned off. Furthermore, when the subtray which carries the disc thereon is transferred to the loading position and the disc is kept under the reproduction stand-by condition, the user may identify the condition of each subtray in accordance with a lighting system in which, for example, the subtray display section corresponding to the subtray is turned on and radiates a green colored light beam. Of course, any other various lighting system for identifying the condition may be considered. For example, flickering the red colored light beam may be used instead of the green color light beam.

Figure 19:
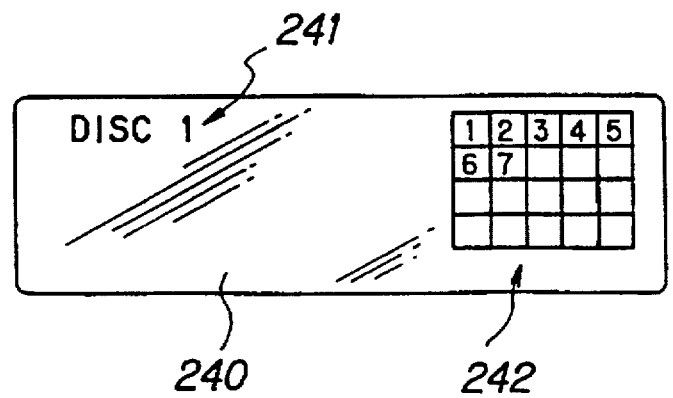
FIG. 19 is an illustration of a structure of a part of the display section of the disc changer apparatus.

Also, a reproducing information display section 240 such as a liquid crystal display element shown in FIG. 19 is provided as a part of the display section 108.

The reproducing information display section 240 may display, for example, the operation conditions and modes and the reproducing time or the like. For example, the reproducing information display section 240 perform the display 241 of the disc which is currently kept under the reproduction stand-by condition or the display (music calendar display) 242 of the tracks recorded on the disc.

A reference numeral 107 denotes a power source circuit. The power source circuit 107 is used for rectifying and smoothing a commercial alternating current power source and supplying a voltage of a direct current operation power source to each part. Under the condition that a supply plug 113 is connected to a domestic power source, i.e., the commercial AC power source, a primary power source is turned on, and a so-called stand-by power source voltage $V_2$ is outputted to be supplied to the controller 100 or the like. Also, the operational power source voltage $V_1$ is fed to each part in correspondence with the user's operation for turning on the power source operating switch.

Since the stand-by power source voltage $V_2$ is always supplied to the controller 100 in the case where the supply plug 113 is connected to the commercial power source, it is possible to perform the operation to some extent also in a stand-by condition, i.e., a so called operation-off state in which the power source operating switch is not turned on and only the supply plug 113 is connected. In some cases, it is possible to control the automatic output of the operation power source voltage $V_1$ to the power source circuit 107.

A reference numeral 110 denotes a motor driver section for driving the above-described ascending/descending motor 37 and the horizontal transferring motor 51. Motor control information $S_{MD}$ is supplied from the controller 100 to the motor driver section 110 on the basis of the motor control information $S_{MD}$. The motor driver section 110 applies the operational current to the ascending/descending motor 37 and the horizontal transferring motor 51 so that the rotational direction and the rotational operation period of the ascending/descending motor 37 and the horizontal transferring motor 51 are controlled by the controller 100.

Figure 20A:
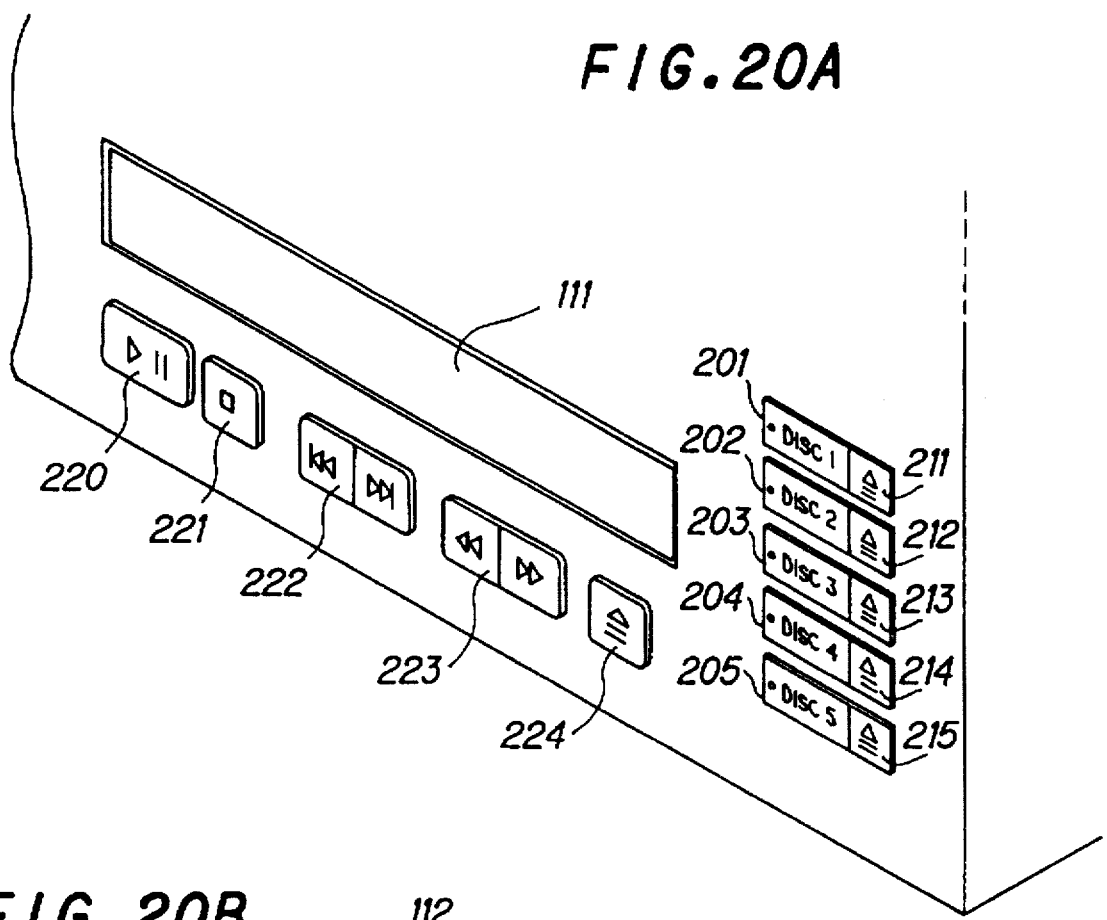
FIGS. 20(a) and 20(b) are perspective views showing a part of a front panel of the disc changer apparatus, with FIG. 20(a) being a perspective view showing a structure of a part of the front panel, and FIG. 20(b) being a perspective view showing a structure of a cover of the front panel.

A reference numeral 111 denotes a cover which is rotatably provided at a front panel of a box in the eject position. For example, as shown in FIG. 20(a), the cover 111 is urged to normally close the opening portion 200 of the front panel by a spring mechanism for shielding the interior of the apparatus from the outside. Then, when the main tray 75 and the subtray 14 are transferred to the eject position, the cover 111 is pushed and rotated at a shaft 111a by the main tray 75 to open the opening portion 200 of the front panel. Incidentally, any other various shapes or forms of the cover 111 may be used.

Figure 20B:
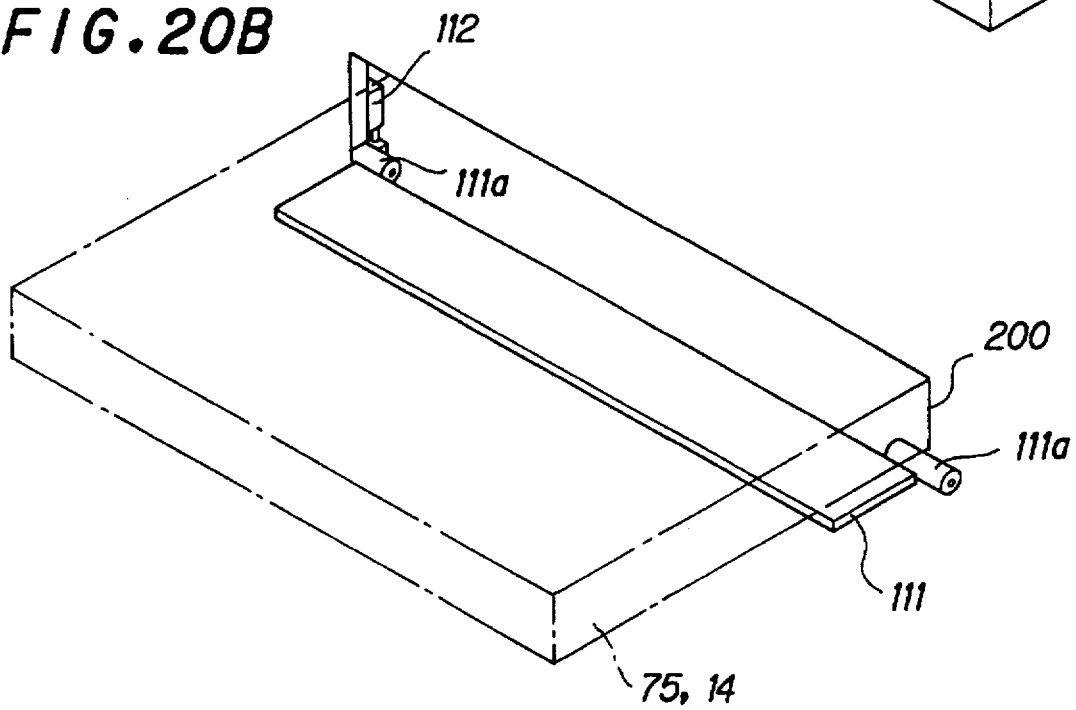

A reference numeral 112 denotes an opening/closing sensor which is switched on/off in response to the opening/closing condition of the opening portion 200. The opening/closing sensor 112 is provided near the lower edge of the opening portion 200 of the front panel of the apparatus and is operated the cover 11 when the cover 111 is rotated to open the opening portion 200. The opening/closing sensor 112 is structured so that the switch is depressed in response to the rotation of the cover 111 in the direction to open the opening portion 200 as shown in FIG. 20(b). Incidentally, any other mechanism may be used as the opening/closing sensor 112 and a photo sensor may be used therefor.

The signals $S_{SEN}$ from the above-described various sensor means are supplied from the changer mechanism to the controller 100 so that the various conditions of the changer mechanism may be detected by the controller 100. Namely, the signals from the photo interrupter 59, the stock detection switch 60, the open/close switch 58 and the out-switch 61 are supplied for detecting the horizontal transferring position, signals from the initial switch 45 and the count switch 40 are also supplied to the controller 100 for detecting the vertical transferring position, and signals from the light receiving element 63 are further supplied for detecting the disc presence/absence on the subtray 14.

Also, the signal from the opening/closing sensor 112 is fed to the controller 100.

<10. TOC data reading-out method of stocked discs>

In the thus constructed changer apparatus, in the case where the discs for which the administration information (hereinafter referred to as TOC data) has not been read are present in the discs that are not currently kept under the reproduction stand-by condition, i.e., the discs received in the stocker 8, the TOC data reading out operation is executed at the time of a chance in which the TOC data reading out operation is possible. In addition, this condition is not notified to the user.

A process for this executed by the controller 100 will be explained according to FIGS. 21 and 22.

Step F100 shown in FIG. 21 shows the condition that the subtray 14 on which a certain disc is received is transferred to the loading position $H_{LD}$, and the disc is kept under the reproduction stand-by condition.

For example, in such a disc changer apparatus, upon the turning on of the power source by the user, or at the time when the supply plug 113 is connected to the commercial power source for the stand-by condition, the mechanical initializing operation is carried out, and the controller 100 may recognize the current positional condition of the transferring mechanism or the subtray which is being transferred. As a result, it may cope with the user's operation thereafter. In order to more quickly cope with the operation, after the mechanical initializing operation, or at the time when the power source is turned on by the user, a certain disc is caused to be ready at the loading position. The initializing operation will be described in detail later.

For example, the disc (the disc recognized as the first disc by the user) accommodated in the stock height position $H_1$ is loaded in advance.

Also, after each operation has been carried out by the user's manipulation, the disc which was selected at this time was caused to be ready in the reproduction stand-by condition in the loading position on the disc reproducing section 5 or the like. Namely, the first disc is first under the reproduction stand-by condition, and thereafter the disc that has been finally selected by the user with the selection keys 201 to 205.

By the light emission condition of the subtray display portion 231 to 235 and the display 241 of the reproducing information display section 240, the user can confirm which disc is kept under the reproduction stand-by condition.

When a certain disc is kept under the reproduction stand-by condition, the operation of the operation keys 220 to 224 is effected for that disc. For example, when the key 220 is depressed, the process is advanced from F101 to F106 to thereby perform the reproduction of the disc kept under the reproduction stand-by condition.

Also, when the open/close key 224 is depressed, in step F106, the subtray of the disc that is kept under the reproduction stand-by condition is ejected.

On the other hand, in the case where the disc selection key 205 is depressed when the first disc is kept under the reproduction stand-by condition, as the process in step F106, the subtray on which the first disc is received is returned and accommodated in the stock height position $H_1$. subsequently, the subtray is drawn at the stock height position $H_5$ and transferred to the loading position $H_{LD}$, and the disc received on the subtray is reproduced.

Also, in the case where the disc selection open/close key 214 is depressed when the first disc is kept under the reproduction stand-by condition, the subtray on which the first disc is received is returned and accommodated in the stock height position $H_1$, subsequently, the subtray is drawn at the stock height position $H_4$ and transferred to the eject position.

Thus, in the case where a certain disc is kept under the reproduction stand-by condition, and the operation such as the reproduction (including dependent operations on the reproducing operation, i.e., fast forward/AMS) is not required, i.e., when there is no current operation to the disc reproducing section 5 and the transferring mechanism, the process is advanced to step 102.

Here, if the TOC data have not yet been read out with respect to the disc kept under the reproduction stand-by condition and loaded on the disc reproducing section 5, first of all, the TOC data of that disc are read out and the read-out TOC data are stored in the RAM 100a (F105). Namely, the immediate reproducing operation is possible during the reproducing manipulation, and at the same time, the display of, for example, the music calendar 242 shown in FIG. 19 is possible with respect to the disc kept under the reproduction stand-by condition.

If the TOC data of the disc which have been already kept under the reproduction stand-by condition and loaded on the disc reproducing section 5 at the time of step F102 have been read, subsequently, it is judged whether or not any disc is present in the plurality of the discs received in the stocker 8 for which the TOC data have not yet been read out. Namely, the controller 100 judges whether or not the TOCs for the five discs have been stored in the RAM 100a.

Then, if one or plural discs for which the TOC data have not yet been read out are present, the TOC data reading-out operation for the discs is effected (F104).

As shown in FIG. 22, in the TOC data reading operation, one or plural discs for which the TOC data have not yet been read are loaded in a predetermined order or in any desired order and the respective TOC data are read and stored in the RAM 100a in order (F201).

For instance, if the first disc is kept under the reproduction stand-by condition and the TOC data of the second to fifth discs have not yet been read out, once the first disc on the disc reproducing section 5 is returned and accommodated in the stocker 8, the subtray on which the second disc is received is picked up in the stock height position $H_2$ and is loaded on the disc reproducing section 5. Then, the TOC data are read out from the second disc and are stored in the RAM 100a. Subsequently after the TOC data of the second disc are completely read out, the second disc is returned to the stocker 8 and the third disc is loaded on the disc reproducing section 5 and in the same way, its TOC data are stored in the RAM 100a. Furthermore, the TOC data reading-out operation is effected to the fourth and fifth discs.

For instance, thus, at the time (F203) when the TOC data reading operation has been completed to all the discs, the first disc which is inherently kept under the reproduction stand-by condition during this period is again picked up from the stocker 8 and transferred to be loaded on the disc reproducing section 5 (F204). The TOC data reading-out operation is finished and the process is returned to the stand-by condition shown in FIG. 20 (F100).

In the meanwhile, the display condition of the display 241 in the subtray display sections 231 to 235 and the reproducing information display section 240 is not changed at all. Namely, actually, during the TOC data reading-out operation, the disc that was kept under the reproduction stand-by condition is once returned and accommodated in the stocker 8 but the display that this disc is kept under the reproduction stand-by condition is always effected to the user.

If, when the disc which is to be loaded is changed by the automatic TOC data reading-out operation, the display is switched, the disc that is kept under the reproduction stand-by condition (i.e., the disc which is operated by the operation keys 220 to 224) is changed without any user's operation. Thus, the user is confused. According to the embodiment, such a confusion is not caused.

Then, the disc that is displayed for the target of the reproduction stand-by is again loaded on the reproducing section in accordance with the completion of the TOC data reading-out operation, the disc is actually returned back to the reproduction stand-by condition. Accordingly, it is possible to quickly cope with the subsequent operation.

By the way, in the case where the operation demand such as the reproducing or eject operation is effected during the TOC data reading-out operation, i.e., in the case where any key shown in FIG. 18 is depressed, the process is advanced from F202 to F205 and the TOC data reading-out operation is immediately stopped even in any condition. Then, the process is advanced to step F106 to cope with the user's key operation.

For example, in the case where the disc selection key 205 is depressed, the loading condition of the fifth disc is immediately realized and the reproducing operation is started. Of course, if the TOC data of the fifth disc have not yet been read at this time, then, the TOC data are read out and subsequently the reproducing operation is executed.

Also, in the case where the disc selection open/close key 212 is depressed, the subtray 14 on which the second disc is received is transferred to the eject position.

Furthermore, for example, in the case where the play key 220 is depressed, since the user's operation is effected to the disc whose operation is currently displayed, i.e., the disc recognized under the reproduction stand-by condition, the TOC data reading-out operation for the discs other than the disc kept under the reproduction stand-by condition is stopped, and the disc that is kept under the reproduction stand-by condition but is once returned and accommodated in the stocker 8 is loaded and reproduced on the reproducing section 5.

Thus, the reaction for the user's operation has a most significant priority, and the TOC data reading-out operation relative to the discs for which TOC data have not yet been read out is carried out in considering the idle period where the operation demand is not made. Accordingly, the operation based upon the user's manipulation is not hindered.

By the way, in the case where the subtray 14 is transferred to the eject position, in general, there is a possibility that the disc received thereon would be changed by another. For this reason, in the case of the eject operation is carried out, the TOC data stored in the RAM 100a are canceled corresponding to the disc laid on the subtray.

In the case where the new disc is received on the subtray and it is accommodated in the stocker 8, the TOC data reading-out operation is automatically carried out by aiming an idle period of the operation of the changer mechanism and the reproducing section 5 as described above.

Incidentally, the timing of cancellation of the TOC data stored in the RAM 100a is not a moment when the open/close key (211 to 215, or 224) is depressed but a time when the subtray is actually kept under the open condition. Namely, until the sensor information shown in FIG. 15 becomes the condition of the open/close transference, the TOC data are not canceled corresponding to the disc received on that subtray.

For example, in the case where at the time when the user depresses the open/close key 211 and immediately thereafter, namely, the first disc is not transferred to the discharge condition, the user notices the error of the operation, and the open/close key 212 is depressed, the controller 100 stops the transference of the first disc and shifts the transferring operation control of the second disc. After all, in some cases, the second disc is ejected and the actually the first disc is not ejected at all. Accordingly, in such a case, it is unnecessary to cancel the TOC data of the first disc from the RAM 100a. Also, if the cancellation is effected, a waste operation to again read out the TOC data has to be carried out later.

Otherwise, there is a system in the case where the TOC data are canceled in the eject operation, in order to avoid the waste operation of the cancellation, the disc is ejected as far as the cancellation is once effected. However, in this system, the operationability is naturally degraded due to the provision of the period where the manipulation is disabled.

However, at the time when the sensor information shown in FIG. 15 indicates the condition of the open/close transference, the TOC data for the transferred disc are canceled, whereby a most preferably process may be ensured because only the TOC of the second disc is canceled in the above-described operational example.

Incidentally, in the case where any disc is not received on a certain subtray 14, the TOC data of the disc corresponding to that subtray are naturally not stored in the RAM 100a. Accordingly, in some cases, corresponding to this condition, the controller 100 performs the TOC data reading-out operation in step F104. Namely, such phenomenon will occur in the case where the detection of the presence/absence is not effected for that subtray.

However, at the time when the subtray 14 is drawn out of the stocker 8 in order to carry out the TOC data reading-out operation, the controller 100 may recognize that the disc is not received or laid thereon on the basis of the information detected by the above-described light emission element 62 and the light receiving element 63. Accordingly, it is possible to dispense with the waste operation to specially execute the TOC data reading-out operation by transferring the subtray 14, corresponding to the disc reproducing section 5, to the loading position $H_{LD}$.

In the case where the disc for which the TOC data have not yet been read out is present in a plurality of stocked discs as described above, at the time when there is no operation to be executed by the disc reproducing section 5 and the transferring mechanism, the controller 100 performs the TOC data reading-out operation to thereby dispense with the TOC data reading-out operation concerning each subsequent operation and to thereby quickly cope with the operation.

For example, in the case where the user depresses any one of the disc selection keys 201 to 205 in order to select and reproduce the disc currently received in the stocker 8, it is possible to perform the display of the music calendar or the display of the total reproducing time with respect to that disc without completion of the transference to the loading position, of course, without waiting for the TOC data reading-out operation.

Also, when the program setting is carried out over a plurality of discs, if the TOC data of all the discs have been read out by the above-described TOC data reading-out operation, the calculation of the accumulation time may be immediately performed. For instance, in the case where the pieces of music are designated like i) the first piece of music of the second disc, ii) the fifth piece of music of the first disc, iii) the eighth piece of music of the fifth disc, . . . . . since the TOC data of each disc have been read out, it is possible to immediately display the accumulation play time on the reproducing information display section 240.

Furthermore, it is possible to check the program input error. For example, despite that the fifth disc only involves five pieces of music, and in the case where the user designates the seventh piece of music of the fifth disc, at the input timing, the controller 100 may recognize that the fifth disc only involves five pieces of music, from the TOC data stored in the RAM 100a. Accordingly, to cope with this immediately, it is possible to process for correcting the input error, for example, to display an error display or cancel the input.

By the way, since the TOC data reading-out operation is carried out absolutely during the idle period of the disc reproducing section 5 and the transferring mechanism, there are some cases where the discs for which the TOC data have not yet been read out are contained in the program input.

Since the disc reproducing section 5 and the transferring mechanism are operated for the operation of the program input or the like, it is possible to execute the TOC data reading-out operation in parallel therewith. However, if the piece of music (track number) inputted in the program is the data for the disc whose TOC data have not yet been read out, the TOC data reading-out operation is performed to that disc with priority.

For example, when the program input is carried out under the condition that the TOC data from the second disc to the fifth disc are not read out and the TOC data reading-out operation to the second disc is being started in parallel, if the user performs the program input of the first piece of music of the fifth disc, the TOC data reading-out operation for the second disc is stopped and the TOC data of the fourth disc are first read out.

Also, under the condition that TOC data of any discs including the disc being under the reproduction stand-by condition have not yet been read out, if the program input is carried out, the TOC data reading-out operation is effected to the discs which are designated from the first piece of music with a priority to the TOC data reading-out operation of the disc being under the reproduction stand-by condition.

With such an operation, it is possible to bring the reaction of the display operation upon the program input into the optimum one.

<11. Program playback mode>

In the thus constructed changer apparatus according, a program playback mode is prepared as one of the reproducing modes. The user can designate and reproducing pieces of music from the five discs accommodated in the stocker 8 in a desired order.

In case of the program playback mode, the user performs the operation of the program mode and performs the designation input of the discs and the tracks as the program steps in the order that he or she would like to reproduce the pieces of music. As the designation of the tracks, it is possible to designate any one of the tracks or all the tracks together.

Figure 23A:
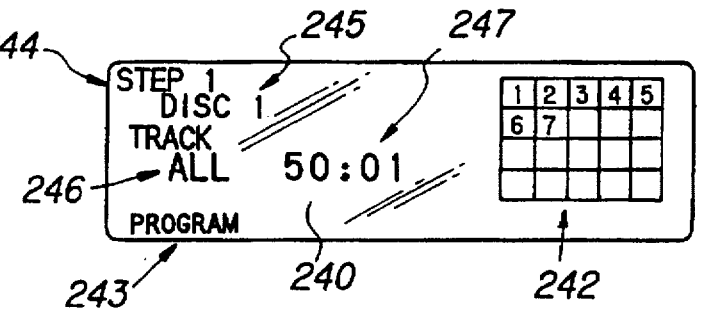
FIGS. 23(a) to 23(c) are illustrations of display examples upon input of a program designation data of the display section.
Figure 23B:
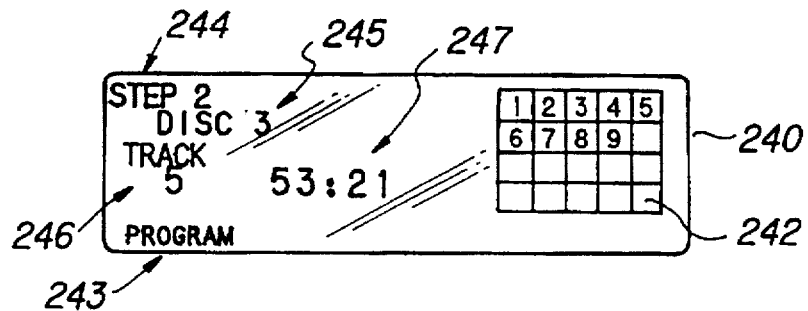
Figure 23C:
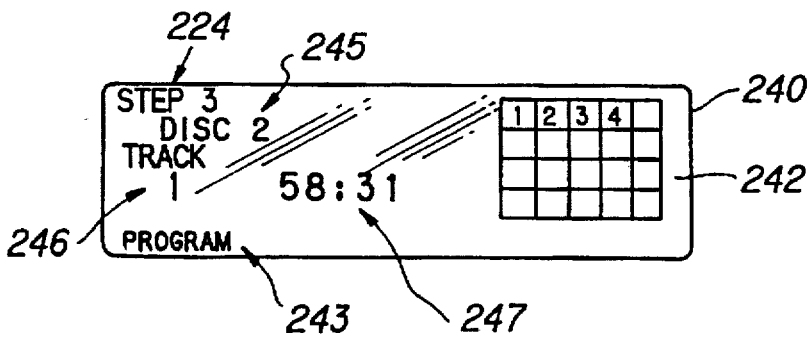

First of all, in the case where the track is designated by the user as the program step 1 in order from the first track to be reproduced the controller 100 performs the display shown on the reproducing information display section 240 in, for example, FIGS. 23(a) to 23(c) with reference to the TOC data of the first to fifth discs stored in the RAM 100a.

First of all, the operation is effected to the program mode so that the mode display 243, "PROGRAM", is executed as shown in FIG. 23(a). Then, the program step number display 244, "STEP 1", is effected to urge the user to give the input.

At the time when the user first designates the disc 1, the designated disc display 245, "DISC 1", is effected, the number of the tracks is judged from the TOC data of the disc and the display (herein after referred to as a music calendar display) 242 of the tracks recorded in the disc is effected in which numbers corresponding to the tracks recorded in a calendar are displayed.

Subsequently, when the user designates the tracks and performs the designation input of all the tracks, the designation track display 246, "TRACK ALL", corresponding to the input is effected to the reproducing information display section 240. Next, total reproducing time information of the first disc is obtained from the TOC data. For example, if it is 50 minutes and 1 second, an accumulation time display 247 is "50:01".

Namely, the designation of all the pieces of music of the first disc is carried out as the program step 1.

Subsequently, if the input of the track 5 (fifth piece of music) of the third disc is effected as the program step 2, the display is shown in FIG. 23(b). The designated disc display 245 and the designated track display 245 are effected in correspondence with the input. Also, the music calendar display 242 and the accumulation time display 247 are effected with reference to the TOC data. For example, if the reproducing time of the track 5 of the third disc is 3 minutes and 20 seconds, 3 minutes and 20 seconds are added to 50 minutes and one second of the program step 1 to obtain 53 minutes and 21 seconds.

Furthermore, if the input of the track 1 (first piece of music) of the second disc is effected as the program step 3, the display is shown in FIG. 23(c).

Hereinafter, in the same way, the program designation will be made while being guided by the play information display section 240. Incidentally, it is not always necessary to execute the display of the accumulation time. For example, it is possible to take a display system in which the display is not effected if the accumulation time exceeds 100 minutes.

For example, if the designation input is carried out by the user for every program step while being guided by the reproducing information display section 240, the program designation data are stored in the RAM 100a, and the reproducing music is selected with reference to the data in the program playback mode.

Figures 24A, 24B:
FIGS. 24(a) and 24(b) are illustration showing an editing process of the program designation data in a RAM.

For instance, in the case where the user has designated the program up to the program step 7, the program designation data shown in, for example, FIG. 24(a) are stored in the RAM 100a.

When the reproducing operation is carried out under this condition, the controller 100 refers to the RAM 100a, such an operational control is carried out that all the pieces of music of the first disc are first played back, thereafter, the fifth piece of music of the third disc is played back, thereafter, the first piece of music of the second disc is reproduced, . . .

<12. Editing of program designation data in accordance with eject operation>

Figure 25:
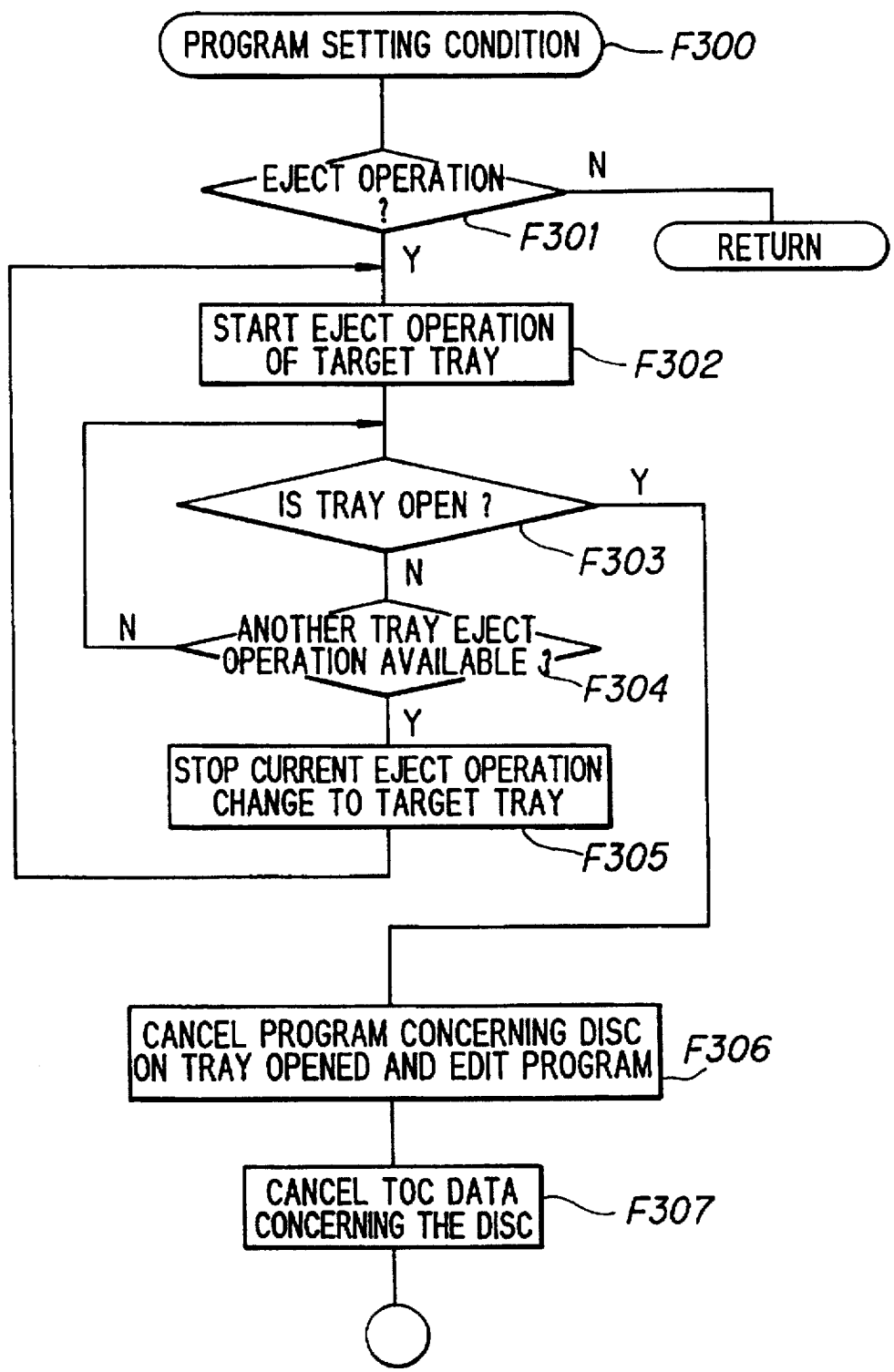
FIG. 25 is a flowchart showing the editing process of the program designation data upon the eject operation of the disc changer apparatus.

Under the condition that the program designation data are thus stored in the RAM 100a, in the case where a certain disc is ejected, in this embodiment, the designation data concerning the disc which has been ejected are canceled or deleted by the controller 100 from the program designation data in the process shown in FIG. 25 so that the program designation data are edited.

Under the condition that the program designation data are held in the RAM 100a (F300), in the case where the eject operation is effected to a certain disc (F301), i.e., in the case where any key operation of the open/close keys 21 to 215 or 224 is carried out, the process is advanced to step F302, and the controller 100 starts the transferring operation to the eject position of the subtray 14 on which the disc is received to be ejected.

Here, the controller 100 supervises the output signal from, for example, the open/close switch 58 of the sensor for detecting the horizontal address of FIG. 15 (F303). The state where the output signal from the open/close switch 58 reaches the condition of the open/close transference in FIG. 15 is the stand-by condition.

After the condition of the open/close transference, i.e., at the time when the disc received on the subtray 14 is discharged to the outside of the apparatus body to the eject positional region on the basis of the output signal from the open/close switch 58, the process is advanced to step F306.

However, in the case where the eject operation for designating other subtrays by the open/close keys 211 to 215 or 224 is effected before the main tray 75 reaches the eject positional region, the subtray 14 which is now being transferred is returned back to the stock position by the main tray 75, the newly designated subtray 4 is a target of eject (F304, F305), and the operation for transferring the subtray 14 to the eject position in step F302 by the main tray 75 is started. Then, the controller 100 is kept under the waiting state until the transfer up to the eject positional region (F303).

When a certain subtray has reached the eject positional region, in step F306, the designation data concerning the n-th disc load on the subtray are canceled or deleted from the program designation data of the RAM 100a.

For instance, when the program designation data of FIG. 24(a) are stored, at the time when the subtray carrying on the third disc is transferred to the eject positional region, the input contents of the program steps 2, 4 and 5 which are the designation data of the third disc are canceled, so that the rest data are rearranged without blanks and the data of the program steps 1 to 4 are newly edited as shown in FIG. 24(b).

Incidentally, if there is no program for the disc which has been transferred to the eject position region, of course, the cancellation and edition of the program designation data are not carried out. For example, when the program designation data shown in FIG. 23(a) are stored, even if the subtray on which the fourth disc is received is transferred to the eject position region, there are no data to be canceled in the program designation data. Accordingly, the edition is not executed.

Incidentally, after the edition of the program designation data in step F306, the TOC data of the disc stored in the RAM 100a as the process necessary in the same manner are also canceled for the possibility that the discs are replaced by the eject operation (F307).

As described above, the program designation is canceled only for the disc to be ejected so that the other program designation data which are still available are stored. In particular, the operation of the program playback mode may be carried out even if the input is again carried out.

Also, the case where the program designation data for a certain disc is actually unnecessary is the case where there is a possibility that the disc is removed from the apparatus, i.e., the disc is transferred outside the cabinet of the apparatus.

Accordingly, in this embodiment, as described above, the timing of the edition execution of the program designation data in the RAM 100a is not immediately after the depression of the open/close key (211 to 215 or 224) but at the time when the subtray is actually transferred to the eject position region by the main tray and held so that, for example, the cover 111 is rotated in a direction in which the opening portion 200 is opened and the opening portion 200 is in an open condition. Thus, an optimum edition operation may be executed.

For example, in the case where the user depresses the open/close key 211, and immediately thereafter at the time when the disc is not transferred to discharge the first disc and to be load on the subtray to project from the opening portion 200 to the outside of the cabinet of the apparatus, the or she notices the error of his or her operation and depresses again the open/close key 212, the controller 100 stops the transferring operation of the first disc and starts to the transferring operation control of the second disc. As a result, after all, in order to eject the second disc from the apparatus body, the first disc is not ejected actually at all. Accordingly, in such a case, it is not proper to cancel or delete the program designation data for the first disc from the RAM 100a. However, in the embodiment, such an improper edition operation is not carried out.

In some cases where the edition is carried out upon the eject operation, in order to avoid the waste edition, the disc is eject as far as the operation is once carried out, and the operation of the other operation key is disabled. However, in the cases, the operationability is of course degraded due to the provision of the operation disable period. In this respect, the process according to the embodiment is available as a system which does not interfere with the operationability.

Incidentally, in the embodiment, the eject position region is from the open/close transference to the eject position, and i.e., the program designation data edition is executed at the time when the subtray 14 is started to be discharged from the cabinet of the apparatus. However, it is possible to set the eject position region only to the complete eject position, and i.e., the program designation data edition is executed at the time when the detection signal condition representative of the eject position in FIG. 15 is obtained.

<13. Mechanical initializing system>

In such the disc changer apparatus, in order to suitably operate the changer mechanism shown in FIGS. 1 to 12, the controller 100 has to recognize the current transference condition. Namely, with respect to the horizontal transferring position as described above, it is possible to recognize the position by the four sensors but with respect to the vertical transferring position, it is impossible to recognize the absolute position except for the initial position (i.e., loading position $H_{HD}$) which may be detected by the initial switch 45. For this reason, the mechanical initial operation is carried out, and the transferring position is judged so that the unknown condition of the subtray which is to be transferred should be obviated. Accordingly, in this embodiment, the mechanical initial operation should be carried out in the order shown in FIGS. 26 and 27(a) to 27(h).

Namely, as the mechanical initial operation, in other words, before the execution of the normal operation, first of all, it is judged which subtray 14 is currently engaged into the main tray 75.

Now, in the embodiment, the mechanical initial operation is executed at the time when the disc changer apparatus is kept under the stand-by condition. Namely, it is executed under the condition before the turn-on of the power source switch by the user (i.e., at the time when the supply plug 113 is connected to the commercial power source, i.e., domestic power source).

The mechanical initial operation is executed in the stand-by state, so that, at the time when the power source switch is turned on by the user, the controller 100 has recognized the current transferring positional condition. It is possible to cope with the operation quickly in response to the user's operation such as the reproduction by selecting the disc.

Figure 26:
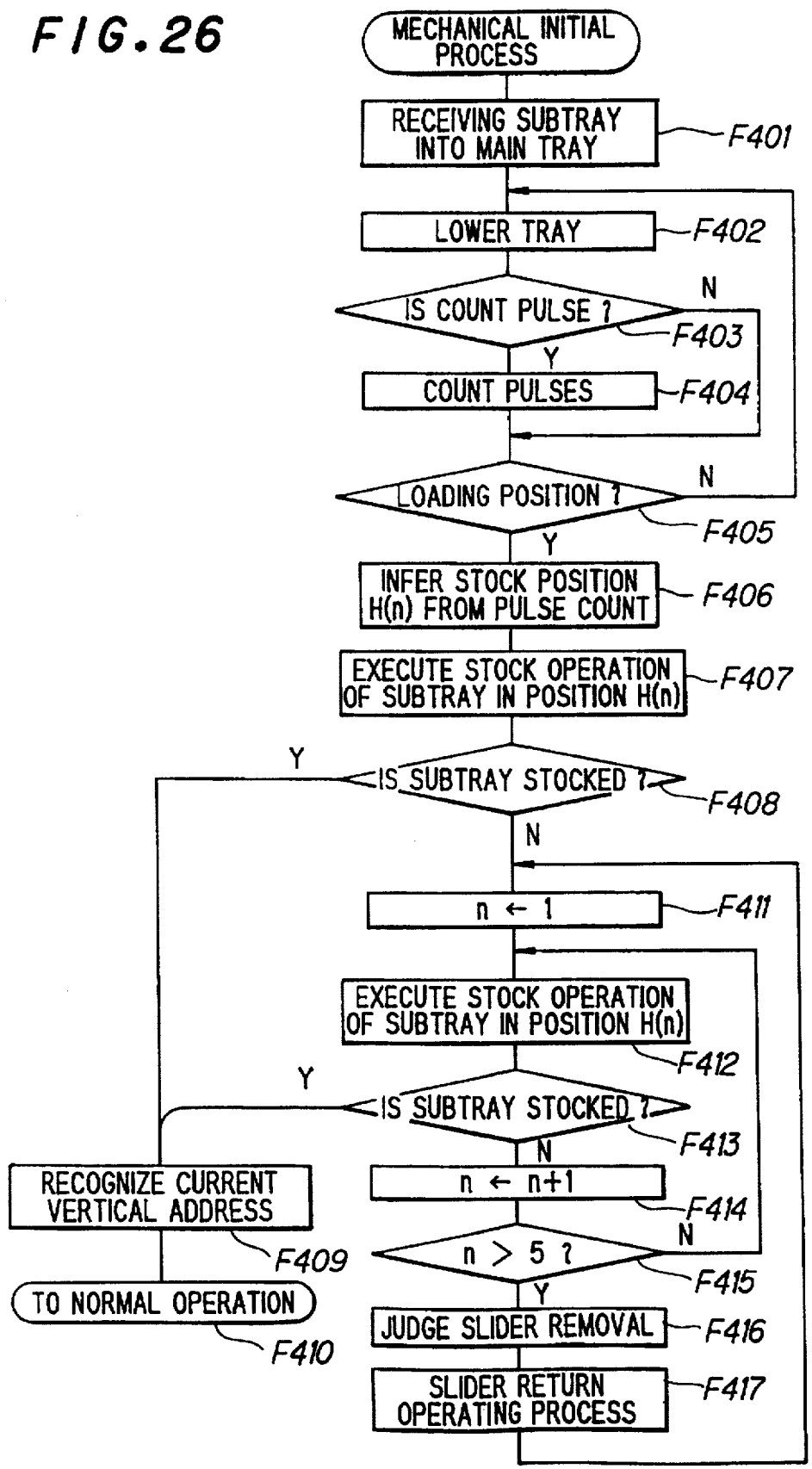
FIG. 26 is a flowchart showing a mechanical initializing method of the disc changer apparatus.

At the time when the supply plug 113 is connected to the commercial power source, the mechanical initial process shown in FIG. 26 is started. First of all, the controller 100 actuates any one of the horizontal transferring motors 51 so that the condition that the subtray 14 is engaged with the main tray 75 is realized (F401). Namely, in FIG. 15, the photo interrupter 59 is kept under the condition "H". Actually at the time when the supply plug 113 is connected to the commercial power source, when the subtray is engaged with the main tray 75, such an engagement operation is not carried out. Also, in the case where all the subtrays 14 are received and accommodated in the stocker 8, the subtray 14 is drawn out at a suitable height position and engaged with the main tray 75. For example, the subtray 14 is drawn out from the condition shown in FIG. 27(a) to the condition shown in FIG. 27(b).

When the main tray 75 and the subtray 14 are engaged with each other, now the descending/ascending motor 37 is actuated to lower the elevator block (i.e., the main tray 75 and the subtray 14 in the elevator block) (F402).

Now, during the lowering operation, a pulse is obtained from the count switch 40 for every one step lowering, the controller 100 counts the pulses from the count switch 40 until it is judged that the condition of the initial switch 45 is changed and the elevator block is lowered (F403, F404, F405).

Figure 27A:
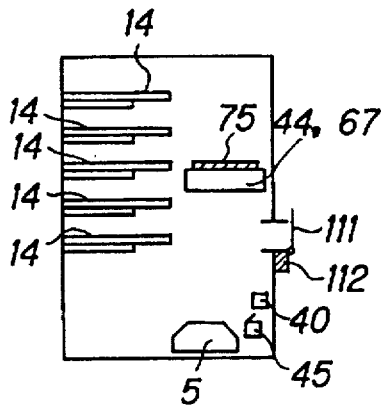
FIGS. 27(a) to 27(h) are schematic illustrations showing an operation of the mechanical initializing method of the disc changer apparatus.
Figure 27B:
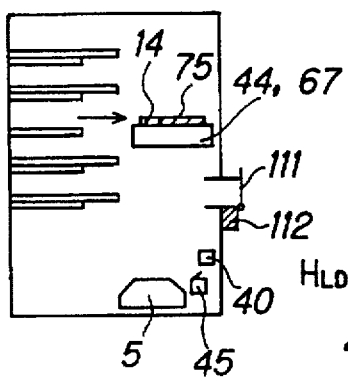
Figure 27C:
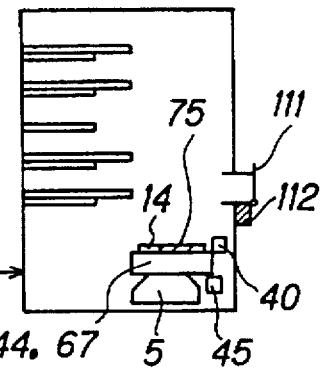

Then, if the lowering motion is finished at the loading position $H_{HD}$ as shown in FIG. 27(c) (F405 to YES), any one of the stock height positions (any one of $H_1$ to $H_5$) of the subtray 14 which is being currently transferred is inferred from the pulse count value of the count switch 40 (F406).

Namely, normally, if the upward movement has the pulse count value which is the same as the pulse count value during the lowering motion, it is possible to determine the stock position of the subtray 14 which is being transferred.

Incidentally, it is possible to determined the transferring position address in the height direction from the initial switch 45 at the time when the main tray 75 is lowered down to the loading position $H_{LD}$. Namely, it is judged that the elevator block is currently located at the loading position $H_{LD}$. For this reason, the ascending/descending operation of the elevator block is carried out by recognizing the absolute address by the pulse count of the count switch 40 (increment upon ascending and decrement upon descending).

The stock position of the subtray 14 being currently transferred may be inferred by the count operation of the step F404. Accordingly, the controller 100 first elevator block elevator block to its stock height position and executes the operation for returning or accommodating the subtray 14 into the stocker 8 (F407).

Figure 27D:
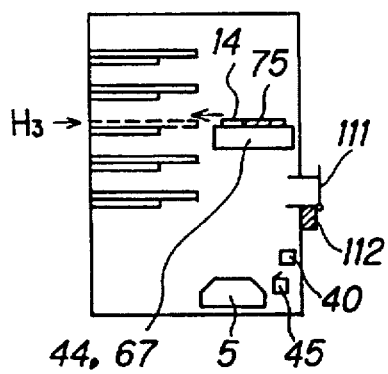

For example, as shown in FIG. 27(d), the controller 100 elevates the elevator block up to the stock height position $H_3$ to thereby perform the stock operation.

Thus, in the case where the subtray 14 which has been transferred may be accommodated in the stocker 8, it is possible to recognize the current transferring condition (F409). For example, in case of FIG. 27(d), it is recognized that the third subtray 14 is being transferred until now, and the elevator block is currently located in the stock height position $H_3$. Thus, after that, it is possible to suitably cope with the disc designation operation by the use. Accordingly, the mechanical initializing operation is finished, and the process is shifted to the normal operation, for example, reproducing operation and transferring operation (F410).

However, there are cases that the subtray 14 could not be returned or accommodated into the stocker 8 in step F407 due to some reasons. For example, in the case where the subtray 14 is insertedly engaged into the main tray 75 at the time of starting the mechanical initializing process, all the conditions should be considered with respect to the height direction position. At this time, the height position is not always the stock height position of the subtray 14. Namely, even if the stock operation is performed at the position elevated by the same pulse count as the pulse count upon the lowering motion, there are cases that the subtray 14 could not be received.

Figure 27E:
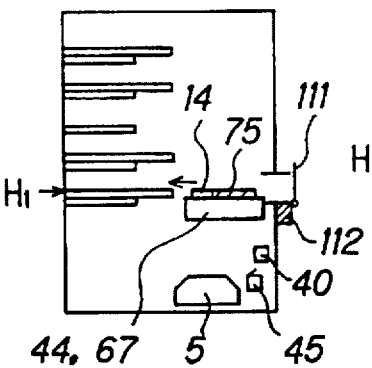

In this case, in step F411, n=1 is established (where "1" is a numerical value for the sake of explanation and is actually the address value representative the stock height position $H_1$), and the elevator block is moved to the stock height position $H_1$. Then, the returning operation of the subtray 14 into the stocker 8 is executed as shown in FIG. 27(e) (F412).

Figure 27F:
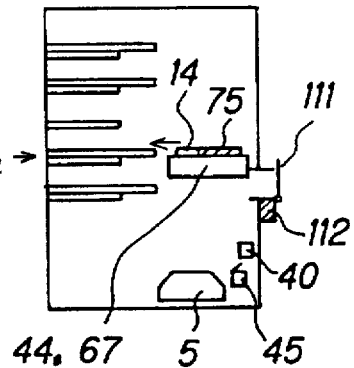

Now, when the subtray 14 is not returned or accommodated in the stocker 8, n is incremented to move the elevator block to the stock height position $H_2$. Then, the returning operation of the subtray 14 into the stocker 8 is executed as shown in FIG. 27(f) (F412).

Namely, in the process from step F411 to F415, the elevator block is moved in the order up to the stock height position $H_5$ and the returning operation is executed at each position.

At the time when the subtray 14 may be stocked, the current transference condition may be recognized (F109). For example, the returning operation is carried out in order from the stock height position $H_1$. If the subtray 14 may be returned or accommodated in the stock height position $H_3$, it is possible to recognize the third subtray 14 is being transferred until now and is currently located in the stock height position $H_3$. Thus, after that, it is possible to suitably cope with the disc designation operation by the use. Accordingly, the mechanical initializing operation is finished, and the process is shifted to the normal operation, for example, reproducing operation and transference operation (F410).

Figure 27G:
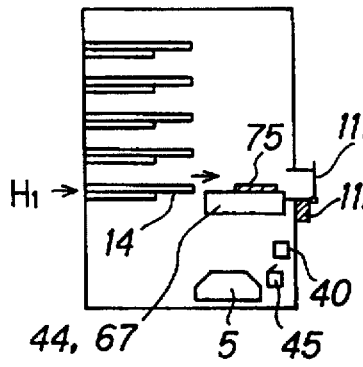
Figure 27H:
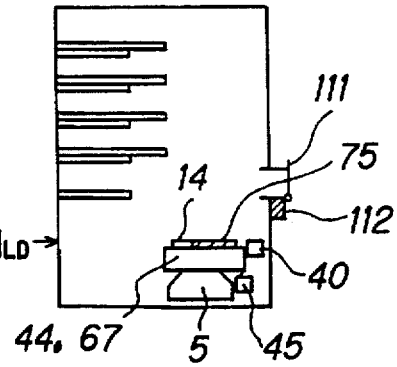

A minimum necessary work for the mechanical initializing operation is finished in step F409. Actually, in the embodiment, after step F409, the elevator block is moved to the stock height position $H_1$ to pick up the subtray 14 at the stock position as shown in FIG. 27(g). The elevator block is moved to the loading position $H_{LD}$ to be ready as shown in FIG. 27(h).

Thus, the specific disc, i.e., the first disc in this case, is transferred to the loading position $H_{LD}$. Accordingly, in the case where the user turns on the power source switch, and further the reproducing operation, for example, the reproducing operation which does not designate any disc, or the reproducing operation which designates the first disc is carried out, it is advantageous that the reproducing operation is immediately executed.

Of course, the disc or the subtray that should be ready within the main tray 75 is not always limited to the first disc but may be set to the other disc or the subtray 14. Also, in the case where the disc is not received on the first subtray, it is possible to carry out the process that the next subtray is picked up and is loaded on the disc reproducing section 5. Furthermore, it is possible to again pick up the subtray that has been used in the above-described mechanical initial operation and to transfer to the loading position after the returning operation.

By the way, there is a possibility that the elevator block could not be returned or accommodated at any position in the stocker 8 even if the elevator block is moved in the order from the stock height position $H_1$ to the stock height position $H_5$ and the receiving operation is carried out in each position. In this case, the process is advanced from the step F415 to the step F416, the engagement between the slider 88 and the subtray 14, i.e., the engagement of the engagement projection 90 of the slider 88 and the engagement recess 15 of the subtray 14 is not carried out. In this case, it is judged that the normal transferring operation of the subtray has not been executed. Namely, the slider 88 involves a mechanical error.

In this case, the process for returning the error condition of the slider 88 to the normal condition is carried out.

As described above, under the condition the slider 88 is drawn out from the main tray 75 and the ascending/descending operation is carried out, the engagement projection 90 passes through the engagement recess 15 of each subtray 14 in the vertical direction as indicated by the one-dot and dash line B in FIG. 3. For this reason, as the restoring process in the case where the slider 88 is not suitably engaged, for example, once the main tray 75 is lowered down to the loading position $H_{LD}$ and the slider 88 is withdrawn (step F417). Then, the process from the step F411 to F415 may be again effected.

For example, there are some cases that the error condition is automatically returned back to the normal condition by such a process, depending upon a kind of mechanical errors.

Then, with the mechanical re-initializing process from the step F411 to F415, the condition of the slider 88 may be returned back to the normal condition. If the current transference condition is recognized, the normal operation, i.e., the transference of the first disc to the loading position $H_{LD}$ in case of this embodiment for the stand-by condition is carried out. After the power source switch is turned on by the user, the process is shifted to the process that the operation corresponding to the manipulation is carried out (F410).

Incidentally, for the mechanical initial operation, it is possible to dispense with F401, F404 and F406 to F408 in the process shown in FIG. 26.

Namely, in the mechanical initial process, the receiving operation of the tray 14 in order from the stock height positions $H_1$ and $H_5$ is always carried out.

With the above-described mechanical initializing operation shown in FIG. 26 or the modification, the number of the sensors for detecting the vertical direction may be reduced only with the initial switch 45 and the count switch 40.

Also, in the above-described mechanical initializing operation, it is possible to attain the desired object, namely, the judge of the subtray to be transferred even if the transferring mechanism before the operation is kept under any condition. Thus, it is also advantageous that it is unnecessary to set a specific transference condition in the factory.

Furthermore, since the mechanical initializing operation is carried out at the time when the supply plug is connected to the commercial power source, in almost all the cases, the mechanical initializing operation is finished at the time when the power source switch is turned on by the user. It is therefore possible to quickly attain each operation in response to the user's manipulation.

Also, even if errors such as removal of the slider during the mechanical initializing operation, the condition might be automatically returned back to the normal condition.

<14. Another mechanical initializing system>

Figure 28:
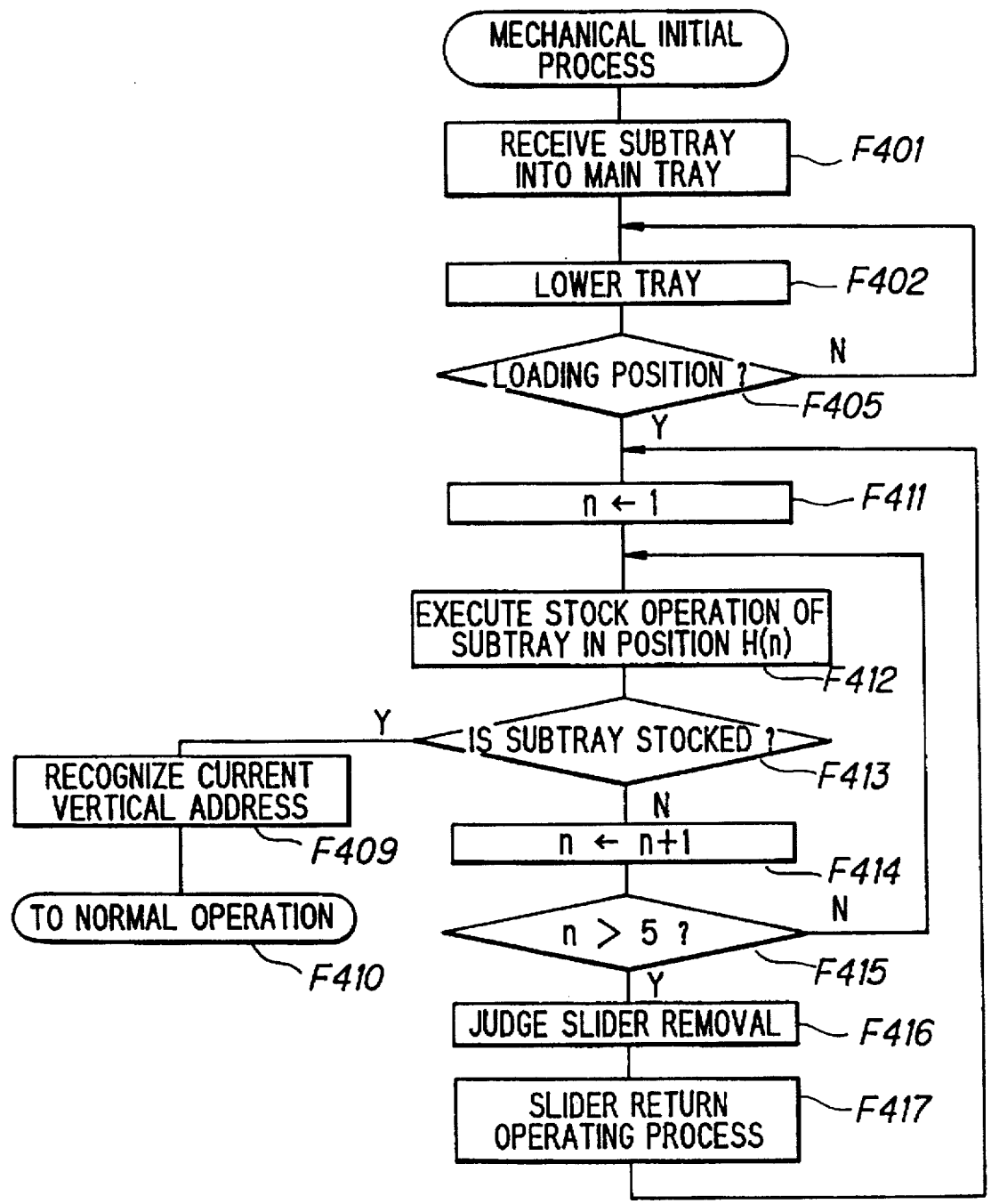
FIG. 28 is a flowchart showing another mechanical initializing method of the disc changer apparatus.

By the way, in addition to the foregoing mechanical initializing process shown in FIG. 26, for example, it is possible to carry out the mechanical initializing operation in accordance with the steps shown in FIG. 28.

In the mechanical initial operation shown in FIG. 28, the steps F401, F404 and F406 to F408 in the process shown in FIG. 26 are dispensed with. Namely, in the mechanical initial process, the returning operation of the tray 14 in order from the stock height positions $H_2$ and $H_5$ is carried out.

Incidentally, in the process having the steps shown in FIG. 28, the same reference numerals are used to designate the like steps as those of FIG. 26 and the duplication of explanation therefor will be avoided.

<15. Error responsible operation during normal operation>

Figure 29:
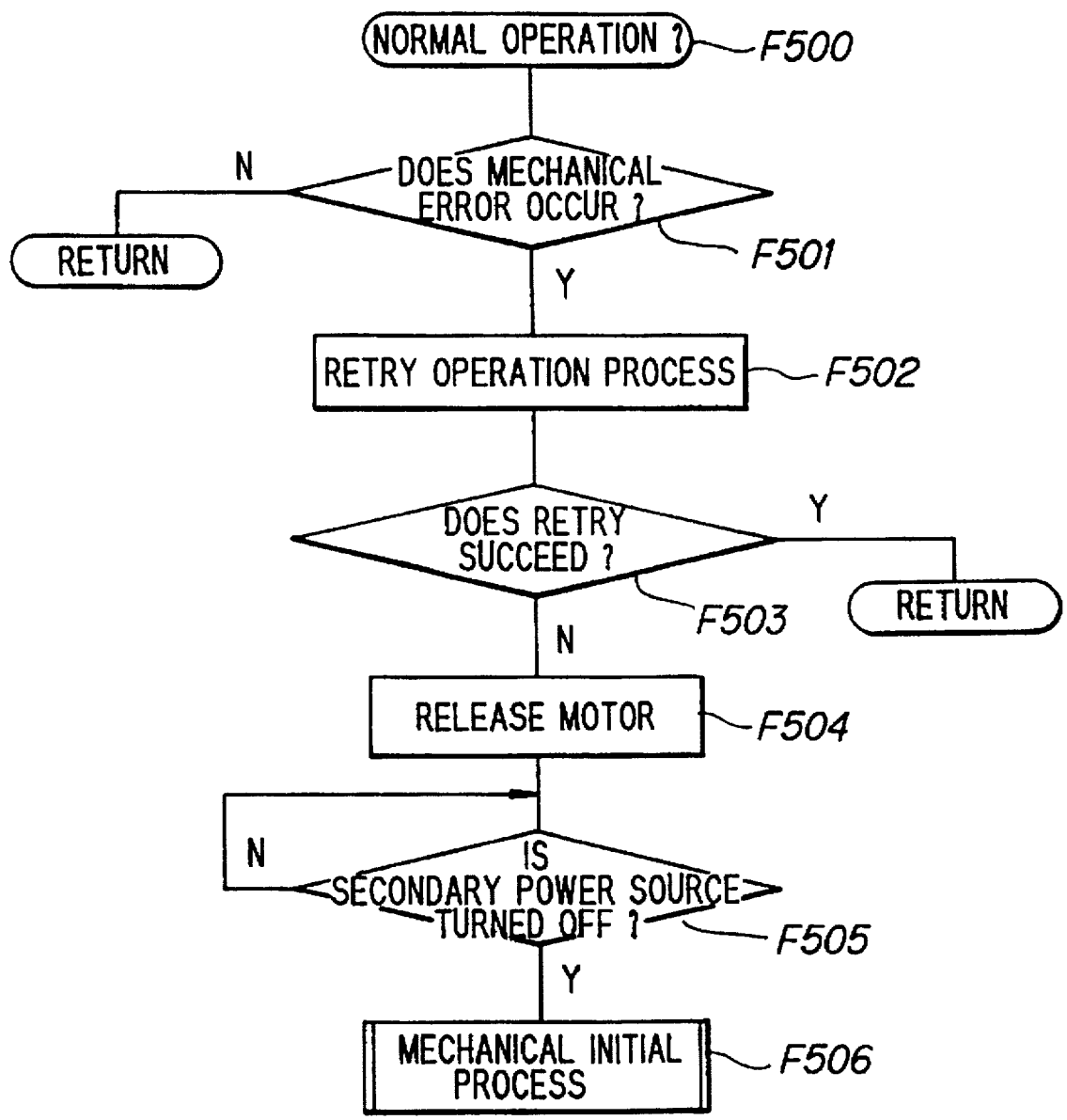
FIG. 29 is a flowchart showing a process upon generation of an error of the disc changer apparatus.

By the way, as described above, if the mechanical error such as removal of the slider 88 for the engagement occurs, the initializing operation is carried out so that the condition might be returned back to the normal operation. Accordingly, in the disc changer apparatus according to the present embodiment, in the case where any mechanical error occurs when the power switch is turned on during the normal operation, the controller 100 executes the control process shown in FIG. 29.

First of all, the controller 100 detects the generation of the mechanical error in the normal operation (F500) by, for example, a time administration. For example, in the ascending/descending operation of the elevator block, it is anticipated that the counter pulse may be obtained from the count switch 40 in a predetermined period of time. However, even if the ascending/descending operation is executed, in the case where any counter pulse could not be obtained even in a lapse of a certain period of time, it is judged that any mechanical error is generated.

In addition, in the case where the sensor information to be naturally detected by the control for the horizontal transferring motor 51 and the descending/ascending motor 37 (such as the photo interrupter 59, the stock detection switch 60, the open/close switch 58, the out-switch 61 and the initial switch 45) is not obtained, it is judged that any error is generated (F501 to YES).

The mechanical error might be the case where the slider removal occurs as described above, or a screw or the like is clamped into any mechanical parts to obstruct the transferring operation, for example.

In such a case, first of all, a retry operation is carried out for again executing the current operational control (F502). If the a suitable operation is executed as the retry operation (i.e., suitable sensor information is obtained), the operation is carried out in the normal condition and the process is returned back to the normal operation (F503 to YES).

However, when the normal condition is not detected even if the retry operation is carried out, there is no method for automatically returning back to the normal operation at that time. The horizontal transferring motor 51 and the ascending/descending motor 37 are released (F504) to stop all the changer operation. Then, the user turns off the power source switch. If the stand-by condition is attained (F505), the above-described mechanical initializing process shown in FIG. 26 or FIG. 28 is executed (F506).

With such a mechanical initializing process, in the disc changer apparatus in the embodiment, if a small mechanical error such as the slider removal occurs, it might be returned back to the normal condition. After the automatic restoration is carried out with the mechanical initializing process, the normal operation may be carried out at the time when the user turns on the power source switch. Accordingly, a risk of the disabled operation due to the breakdown or malfunction is very small.

<16. Emergency stop due to opening of cover>

An operation for risk prevention for the user and the disc changer apparatus per se will be explained.

The cover 111 is provided at the eject position on the front panel of the cabinet of the apparatus. In the normal state, the interior of the apparatus is shielded through the opening portion 200 from the eject position so that the finger, the foreign matter or the like is prevented from entering the interior of the apparatus. If this cover 111 is opened by the fingers of the user and the fingers or the foreign matters are entered into the interior mechanism, they might reach the parts of the elevator block.

As described above, the elevator block performs the transferring operation in the vertical direction. However, if the fingers or foreign matters are entered during the vertical transferring operation, the fingers would be clamped between the elevator block and other parts to be injured or the introduction of the foreign matters would cause the breakdown or malfunction. Incidentally, there is not such a risk during the horizontal transference.

Figure 30:
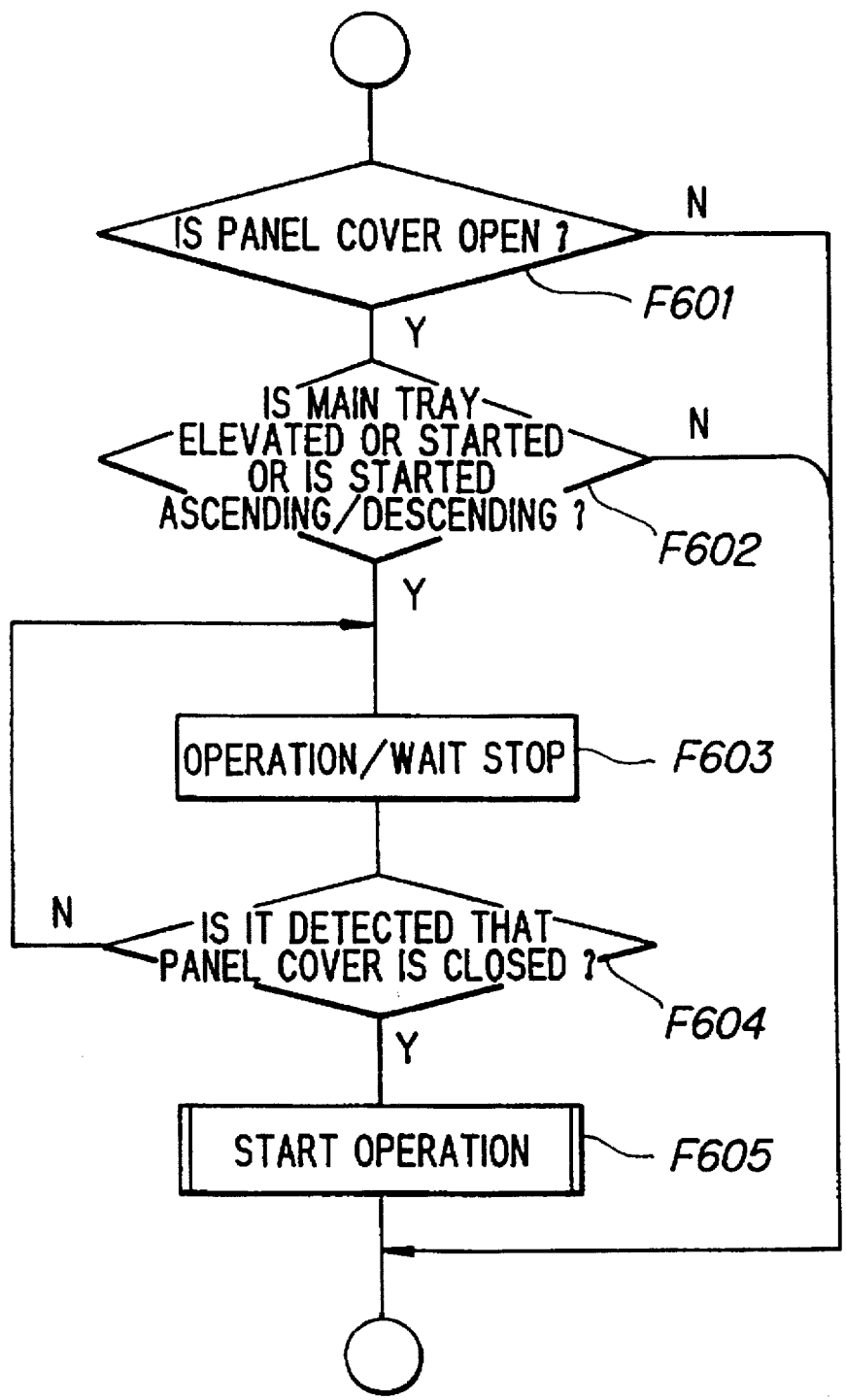
FIG. 30 is a flowchart showing an emergency process upon opening of a cover of the disc changer apparatus.

Accordingly, the controller 100 performs a control shown in FIG. 30 to avoid such risks.

Namely, the controller 100 always supervises the condition of the open/close sensor 112 (F601). If it is detected by the open/close sensor 112 that the cover 111 is located at a position where the opening portion 200 is opened and namely, is opened, the process is advanced to step F602. Now, it is judged whether the operation is kept under the descending/ascending operation control of the elevator block or is to start the descending/ascending operation of the elevator block.

If the process is any other operational condition, i.e., the reproducing operation or the transferring operation in, for example, the horizontal transferring operation, even if the cover 111 is opened, there is no special risk. Also, of course, the cover 111 is opened during the horizontal transferring operation from the play position to the eject position. In those cases, the process shown in FIG. 30 is finished and the operation condition is kept on (F602 to NO).

However, if the process is in the descending/ascending operation control of the elevator block or to start the descending/ascending operation of the elevator block, the process is advanced to step F603 where the descending/ascending operation is stopped in emergency or the descending/ascending operation is not started. Namely, the operation of the descending/ascending operation 51 is stopped in emergency to prevent the descending/ascending operation of the elevator block.

Then, at the time when it is detected that the cover 111 is closed by the open/close sensor 112 in step F604, a predetermined operation is started (F605).

If the cover 111 is thus opened during a period of the descending/ascending operation of the elevator block, the controller 100 stops the descending/ascending operation to thereby avoid risks of injury or breakdown.

Figure 31A:
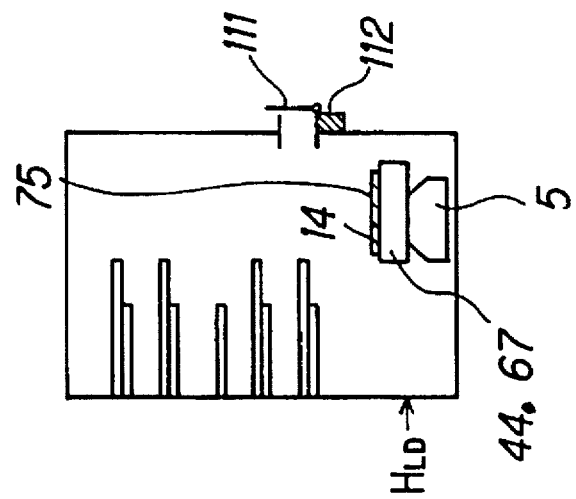
FIGS. 31(a) to 31(c) are schematic illustrations of an emergency process upon opening of the cover of the disc changer apparatus.
Figure 31B:
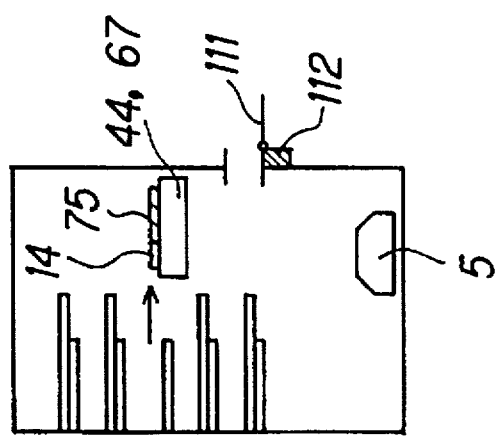

For example, assuming the operation of loading the disc to the subtray 14 at the stock height position $H_3$, first of all, the elevator block is delivered to the stock height position $H_3$ as shown in FIG. 31(a), and the subtray 14 is drawn out. Now, assume that the cover 111 is opened during the withdrawal of the subtray. The normal operation with the process of step F602 (to NO) is carried out during the horizontal operation period for withdrawing the subtray 14 from the stocker 8 to the main tray 75. After the subtray 14 has been withdrawn into the main tray 75, when the it is transferred to the loading position $H_{LD}$, if the cover 111 is opened as shown in FIG. 31(b), the transferring operation is not executed but ready for transfer.

Figure 31C:
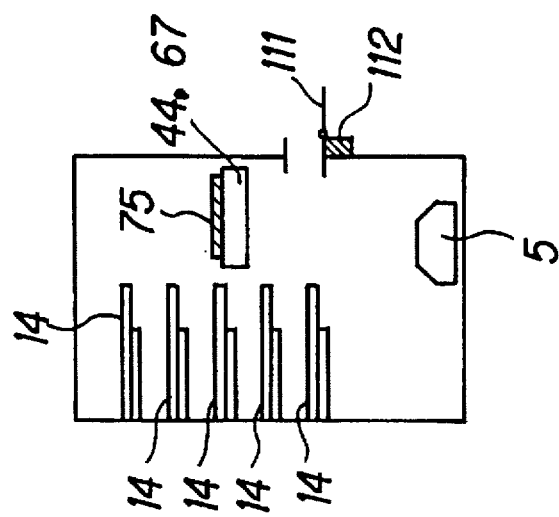

Thereafter, if it is detected by the open/close sensor 112 that the cover 111 is closed, a predetermined return operation is carried out and the interrupted predetermined operation is started. The disc of the subtray 14 in the stock height position $H_3$ is loaded as shown in FIG. 31(c).

<17. Recovery operation from emergency stop>

After the cover 111 is opened and stopped in emergency as described above, if the cover 111 is closed, the operation is started. Now, there are cases that the address in the vertical direction during the emergency stopping period is unknown. For example, in the case where the operation is stopped at the moment when the count pulse of FIG. 16 has occurred, the pulse is again counted upon the re-start and an address error would occur.

For this reason, upon the re-start of the step F605 in FIG. 30, first of all, the mechanical initializing operation as explained in FIG. 26 is carried out. After the vertical address is again clearly recognized by the controller 100 with the mechanical initializing operation, if the operation is the inherent target operation, for example, the loading disc exchanging operation, the eject operation is carried out during the exchanging operation or the eject operation.

Incidentally, in some cases, the mechanical initializing operation is not always necessary. Namely, in the case where the transference from FIG. 31(b) to FIG. 31(c) for the loading position has been interrupted, after the re-start operation, the initial switch 45 is turned on when the elevator block is lowered to the loading position and the absolute address is re-determined. Accordingly, it is unnecessary to carry out the mechanical initializing operation during the re-start operation. However, since the mechanical initializing operation involves the automatic return operation due to the mechanical error as described above, in view of any risk such as entrainment of foreign matters, it is preferable to execute the mechanical initializing operation even if it is unnecessary for the determination of the address.

The mechanical initializing operation is always carried out in the recovery operation. The following operation in step 605 will be explained with reference to FIG. 32.

Figure 32:
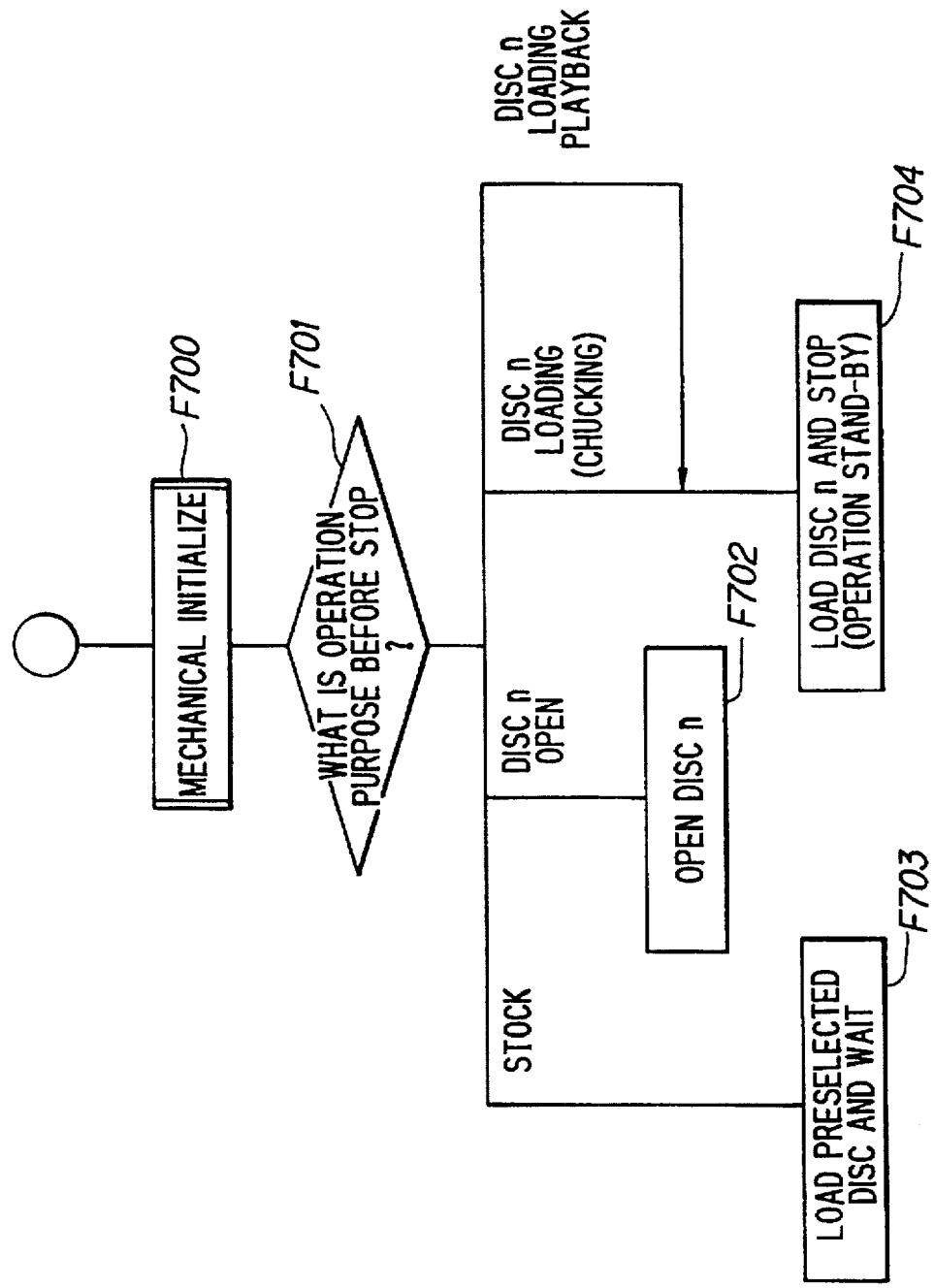
FIG. 32 is a flowchart showing a return operation after the cover of the disc changer apparatus has been closed.

First of all, as the recovery operation, as described above, the mechanical initializing operation is carried out as shown in FIG. 32 in step F700. Thereafter, the process of F701 to F704 is executed in response to the target of the operation that is to be performed before the emergency stop.

The respective cases will be explained.

(1) Recovery from interruption upon eject operation

This is, for example, the case where the user tries to pick up the n-th disc from the stocker 8, and after the disc selection open/close key (any one of 211 to 215 or 224) has been depressed, the cover 111 is opened, so that the vertical transference is interrupted. The object of the operation in step F701 is the case where it is judged that the n-th disc is opened. In this case, the n-th disc (the n-th subtray 14) is transferred to the eject position (F702) as the process after the mechanical initializing operation of step F700.

(2) Recovery from interruption upon stock

This is the case where when the ejected subtray 14 is to be received, the cover 111 is opened during the vertical transferred and its operation is interrupted. At this time, if the cover 111 is closed and the mechanical initializing operation is carried out in step F700, the stock operation is realized by the above-described initializing operation.

Accordingly, the stock operation is dispensed with after the initializing operation. However, as described above, in the case where the loading operation of the predetermined subtray is carried out after the mechanical initializing operation, the stock operation may be executed in step F703.

(3) Recovery from interruption during exchange of loading disc or reproducing disc This the case where during the transference when the disc being loaded or being reproduced is returned back to the stocker 8 or the transference when the disc is transferred from the stocker 8 to the loading position, the cover 111 is opened and its operation is interrupted. In this case, after the cover 111 is closed and the mechanical initializing operation is carried out in step F700, a new disc to be exchanged is transferred to the loading position (F704).

Incidentally, in the case where the disc exchange is intended during the continuous reproduction of the discs, after the new disc is loaded, it is possible to modify the step so that the stop condition is kept and the reproducing operation is not re-started. Namely, in this case, the process is also advanced to step F704.

Various specific operational systems other than the above-described systems may be applied to the recovery operation. In any case, the suitable re-start operation may be set in response to the condition before the operation stop and structure/function of the apparatus.

Although the mechanical initializing methods according to the embodiments of the invention have been described as to the disc changer apparatus, it is apparent that the present invention is not limited to the specific embodiments but may be applied to various kinds of the apparatus by variously changing the parts or components within the scope of the spirit of the invention.

What is claimed is:

1. A reproducing apparatus for a recording medium in which administration information for the recording medium is recorded, the apparatus comprising:

a stocking section for stocking a plurality of recording media including the recording medium;

reproducing means for reproducing information and administration information from the recording media;

transferring means for selectively picking up the recording medium from the stocking section and transferring the recording medium between the stocking section and the reproducing means, and transferring the recording medium to an eject position out of the reproducing apparatus;

storage means for storing the administration information of the recording media reproduced by the reproducing means; and control means for controlling each operation of the transferring means, the reproducing means and the storage means wherein if any recording medium for which the administration information is not stored in the storage means is present in the plurality of recording media stocked in the stocking section when a reproducing operation of the recording medium by the reproducing means is undergoing a reproduction stand-by condition, the control means controls the transferring means to pick up from the stocking section the recording medium for which the administration information has not been stored into the storage means, reproduces the recording medium, and stores the administration information of the recording medium in the storage means.

2. The reproducing apparatus according to claim 1, wherein when the storage means is undergoing a storage operation of the recording medium for which the administration information is not stored in the storage means and at the same time a reproduction start command of the recording medium by the reproducing means is issued, the control means interrupts the storage operation.

3. The reproducing apparatus according to claim 1, further comprising operation input means for setting an operational condition of the reproducing apparatus by a user of the reproducing apparatus, wherein when the storage means is undergoing a storage operation of the recording medium for which the administration information is not stored in the storage means and at the same time a reproduction start command of the recording medium is set by the operation input means, the controller interrupts the storage operation, picks up from the stocking section the recording medium that has been loaded on the reproducing means during the stand-by condition and transfers the recording medium to the reproducing means.

4. The reproducing apparatus according to claim 3, wherein when the recording medium is transferred to the eject position, the control means deletes from the storage means the administration information of the recording medium which has been transferred to the eject position.

5. The reproducing apparatus according to claim 1, further comprising display means for performing a display operation based on a control signal from the control means, wherein the display means displays information concerning the recording medium being reproduced by the reproducing means.

6. The reproducing apparatus according to claim 5, wherein when the storage means is undergoing a storage operation of the recording medium for which the administration information is not stored in the storage means, the control means displays on the display means the information concerning the recording medium that has been loaded on the reproducing means during the reproduction stand-by condition.

7. A reproducing apparatus for a recording medium in which administration information for the recording medium is recorded, the apparatus comprising:

a stocking section for stocking a plurality of recording media;

reproducing means for reproducing information and administration information from the recording media;

transferring means for selectively picking up the recording medium from the stocking section and transferring the recording medium between the stocking section and the reproducing means, and transferring the recording medium to an eject position out of the reproducing apparatus;

storage means for storing the administration information of the recording media reproduced by the reproducing means;

control means for controlling each operation of the transferring means, the reproducing means and the storage means,
   wherein if any recording medium for which the administration information is not stored in the storage means is present in the plurality of recording media stocked in the stocking section when a reproducing operation of the recording medium by the reproducing means is undergoing a reproduction stand-by condition, the control means controls the transferring means to pick up from the stocking section the recording medium for which the administration information has not been stored into the storage means, reproduces the picked up recording medium, and stores the administration information of the recording medium in the storage means;
   wherein when the storage means is undergoing a storage operation of the recording medium for which the administration information is not stored in the storage means and simultaneously a reproduction start command of the recording medium by the reproducing means is issued, the control means interrupts the storage operation; and
   operation input means for setting an operational condition of the reproducing apparatus by a user of the reproducing apparatus, wherein when the storage means is undergoing a storage operation of the recording medium for which the administration information is not stored in the storage means and a reproduction start command of the recording medium by the operation input means is simultaneously issued, the controller interrupts the storage operation, picks up from the stocking section the recording medium that has been loaded on the reproducing means during the stand-by condition and transfers the picked up recording medium to the reproducing means.

8. A reproducing apparatus for a recording medium in which administration information for the recording medium is recorded, the apparatus comprising:

a stocking section for stocking a plurality of recording media including the recording medium;

reproducing means for reproducing information and administration information from the recording media;

transferring means for selectively picking up the recording medium from the stocking section and transferring the recording medium between the stocking section and the reproducing means, and transferring the recording medium to an eject position out of the reproducing apparatus;

storage means for storing the administration information of the recording media reproduced by the reproducing means; and control means for controlling each operation of the transferring means, the reproducing means and the storage means;
   wherein if any recording medium for which the administration information is not stored in the storage means is present in the plurality of recording media stocked in the stocking section when a reproducing operation of the recording medium by the reproducing means is undergoing a reproduction stand-by condition, the control means controls the transferring means to pick up from the stocking section the recording medium for which the administration information has not been stored into the storage means, reproduces the picked up recording medium, and stores the administration information of the picked up recording medium in the storage means;
   wherein when the storage means is undergoing a storage operation of the recording medium for which the administration information is not stored in the storage means and simultaneously a reproduction start command of the recording medium by the reproducing means is issued, the control means interrupts the storage operation; and
   wherein when the recording medium is transferred to the eject position, the control means deletes from the storage means the administration information of the recording medium which has been transferred to the eject position.

9. A control method for a reproducing apparatus for a recording medium in which administration information that administrates recorded information is recorded together with the recorded information, the reproducing apparatus having a stocking section for stocking a plurality of recording media including the recording medium, reproducing means for reproducing information and administration information from the recording media, transferring means for selectively picking up the recording medium from the stocking section and transferring the recording medium between the stocking section and the reproducing means and transferring the recording medium to an eject position out of the reproducing apparatus, and storage means for storing the administration information of the recording media reproduced by the reproducing means, the control method comprising the steps of:

if any recording medium for which the administration information is not stored in the storage means is present in the plurality of recording media stocked in the stocking section when a reproducing operation of the recording medium by the reproducing means is undergoing a reproduction stand-by condition, controlling the transferring means to pick up from the stocking section the recording medium for which the administration information has not been stored into the storage means, reproducing the picked up recording medium, and storing the administration information of the picked up recording medium in the storage means.

10. The method according to claim 9, the control method further comprising the step of when the storage means is undergoing a storage operation of the recording medium for which the administration information is not stored in the storage means and simultaneously a reproduction start command of the recording medium by the reproducing means is issued, interrupting the storage operation.

* * * * *